United States Patent
Ishida et al.

(10) Patent No.: US 7,760,442 B2
(45) Date of Patent: Jul. 20, 2010

(54) VOICE COIL MOTOR CONTROL DEVICE AND METHOD OF DRIVING THE SAME, IMAGE PICKUP DEVICE

(75) Inventors: Kozo Ishida, Tokyo (JP); Atsushi Michimori, Tokyo (JP); Noriyuki Komori, Tokyo (JP); Hideki Kunishio, Tokyo (JP); Hiroaki Sugiura, Tokyo (JP); Takashi Itow, Tokyo (JP); Tetsuya Kuno, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 516 days.

(21) Appl. No.: 11/666,945

(22) PCT Filed: Oct. 25, 2005

(86) PCT No.: PCT/JP2005/019571

§ 371 (c)(1),
(2), (4) Date: Apr. 30, 2007

(87) PCT Pub. No.: WO2006/049039

PCT Pub. Date: May 11, 2006

(65) Prior Publication Data

US 2008/0130134 A1 Jun. 5, 2008

(30) Foreign Application Priority Data

Nov. 1, 2004 (JP) ............................. 2004-318007

(51) Int. Cl.
*G02B 15/14* (2006.01)
*G02B 7/02* (2006.01)
(52) U.S. Cl. ..................... 359/698; 359/823; 359/824
(58) Field of Classification Search ......... 359/694–700, 359/819–824; 310/10–39
See application file for complete search history.

(56) References Cited

U.S. PATENT DOCUMENTS

| 5,323,368 | A | * | 6/1994 | Semba | ............... 369/30.17 |
| 5,980,211 | A | | 11/1999 | Tojo et al. | ............... 417/45 |
| 6,233,009 | B1 | * | 5/2001 | Morofuji et al. | ......... 348/208.8 |
| 6,363,214 | B1 | * | 3/2002 | Merello et al. | ............. 318/109 |
| 6,527,519 | B2 | | 3/2003 | Hwang et al. | ........... 417/44.11 |

(Continued)

FOREIGN PATENT DOCUMENTS

JP        8-98575 A        4/1996

(Continued)

*Primary Examiner*—Mohammed Hasan
(74) *Attorney, Agent, or Firm*—Birch, Stewart, Kolasch & Birch, LLP

(57) ABSTRACT

The present invention provides a control device capable of improving hysteresis characteristics of a voice coil motor (31) and attaining a suitable lens position without complicating the structure of the control device. As solving means of the invention, a voice coil motor control device (30) includes a driving current control part (34) that controls a driving current supplied to the voice coil motor (31) in accordance with a driving pulse subjected to pulse width modulation, and a driving pulse control part (32) that divides a drive period of the voice coil motor (31) into a movement period and a holding period, and controls the driving pulse by changing the duty ratio of the driving pulse during the movement period in accordance with a duty setting value and fixing the duty ratio of the driving pulse during the holding period to the duty setting value.

11 Claims, 22 Drawing Sheets

U.S. PATENT DOCUMENTS

| | | | |
|---|---|---|---|
| 6,954,313 B2 * | 10/2005 | Kaneda et al. | 359/696 |
| 7,400,068 B2 * | 7/2008 | Tseng | 310/12.16 |
| 7,463,436 B2 * | 12/2008 | Takahashi et al. | 359/824 |
| 2008/0231975 A1 * | 9/2008 | Hou et al. | 359/824 |
| 2008/0246353 A1 * | 10/2008 | Kuo et al. | 310/14 |

FOREIGN PATENT DOCUMENTS

| | | |
|---|---|---|
| JP | 8-186752 A | 7/1996 |
| JP | 9-117178 A | 5/1997 |
| JP | 10-122141 A | 5/1998 |
| JP | 2002-213367 A | 7/2002 |
| KR | 2003-0010477 A | 2/2003 |

* cited by examiner

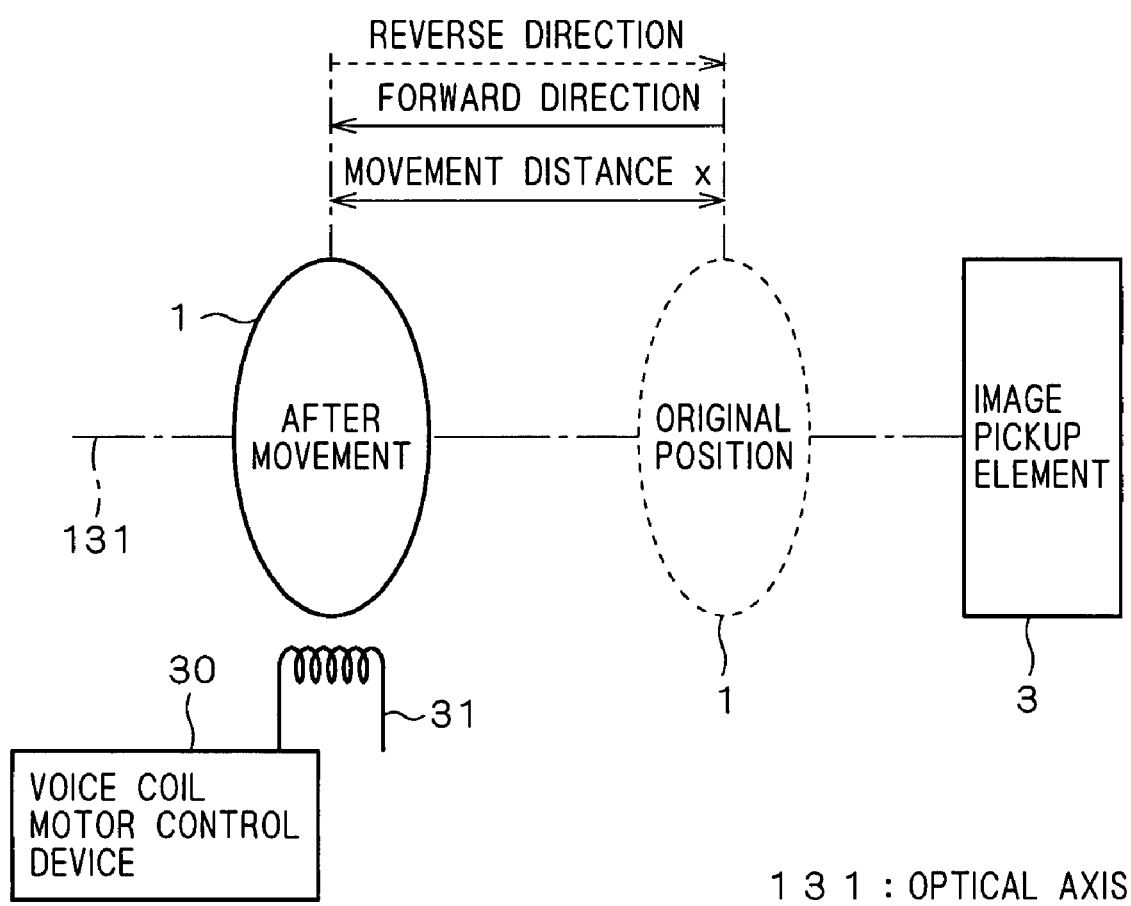

F I G. 6

| DUTY SETTING VALUE | FIRST PERIOD | | SECOND PERIOD | | THIRD PERIOD | | (n-1)th PERIOD | | n-th PERIOD | |
|---|---|---|---|---|---|---|---|---|---|---|
| | AMPLITUDE (%) $\Delta D1$ | TIME(msec) $\delta T1$ | AMPLITUDE (%) $\Delta D2$ | TIME(msec) $\delta T2$ | AMPLITUDE (%) $\Delta D3$ | TIME(msec) $\delta T3$ | AMPLITUDE (%) $\Delta Dn-1$ | TIME(msec) $\delta Tn-1$ | AMPLITUDE (%) $\Delta Dn$ | TIME(msec) $\delta Tn$ |
| 0 | 10 | 2 | 0 | 2 | 10 | 2 | 0 | 2 | 10 | 2 |
| 10 | 10 | 2 | -10 | 2 | 10 | 2 | -10 | 2 | 10 | 2 |
| 20 | 10 | 2 | -10 | 2 | 10 | 2 | -10 | 2 | 10 | 2 |
| 30 | 10 | 2 | -10 | 2 | 10 | 2 | -10 | 2 | 10 | 2 |
| 40 | 10 | 2 | -10 | 2 | 10 | 2 | -10 | 2 | 10 | 2 |
| 50 | 10 | 2 | -10 | 2 | 10 | 2 | -10 | 2 | 10 | 2 |
| 60 | 10 | 2 | -10 | 2 | 10 | 2 | -10 | 2 | 10 | 2 |
| 70 | 10 | 2 | -10 | 2 | 10 | 2 | -10 | 2 | 10 | 2 |
| 80 | 10 | 2 | -10 | 2 | 10 | 2 | -10 | 2 | 10 | 2 |
| 90 | 10 | 2 | -10 | 2 | 10 | 2 | -10 | 2 | 10 | 2 |
| 100 | 0 | 2 | -10 | 2 | 0 | 2 | -10 | 2 | 0 | 2 |

F I G . 1 7
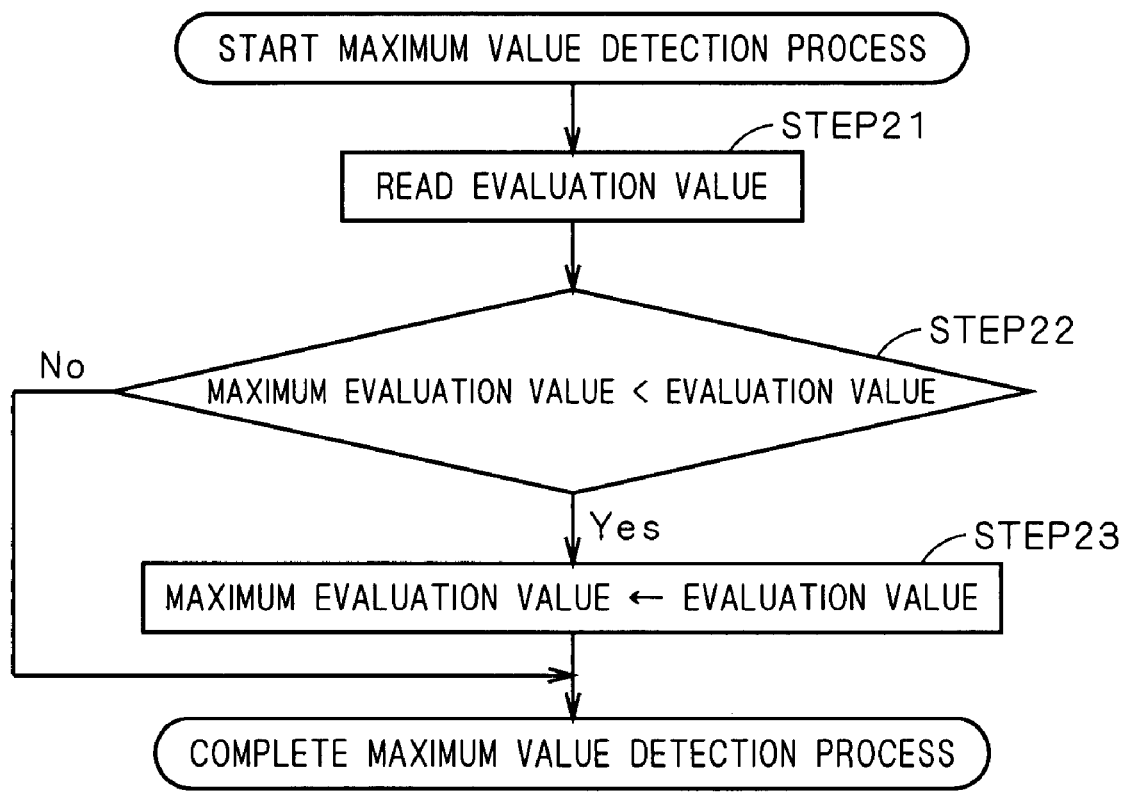

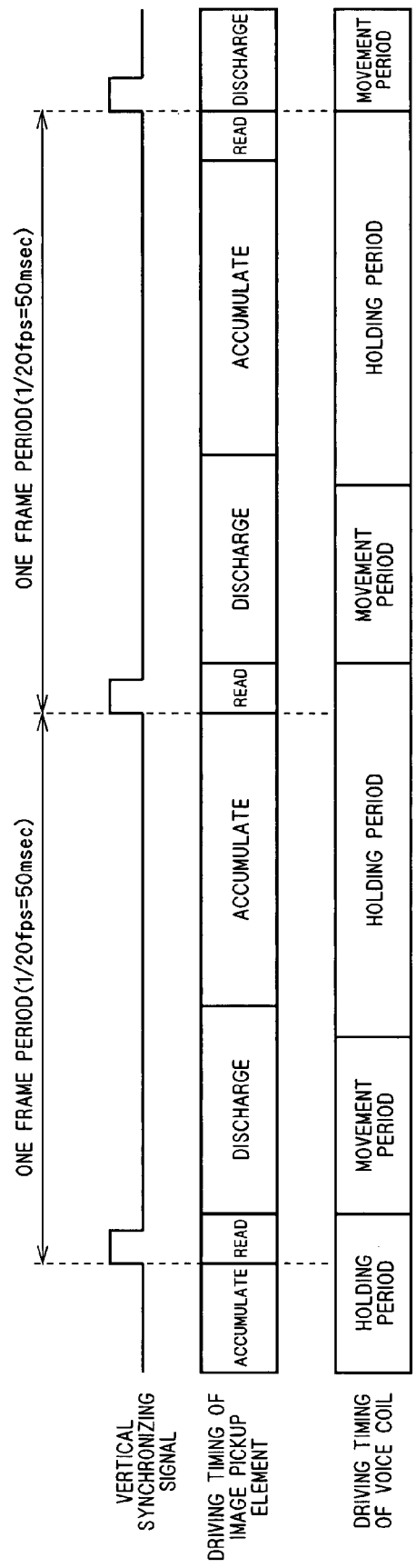

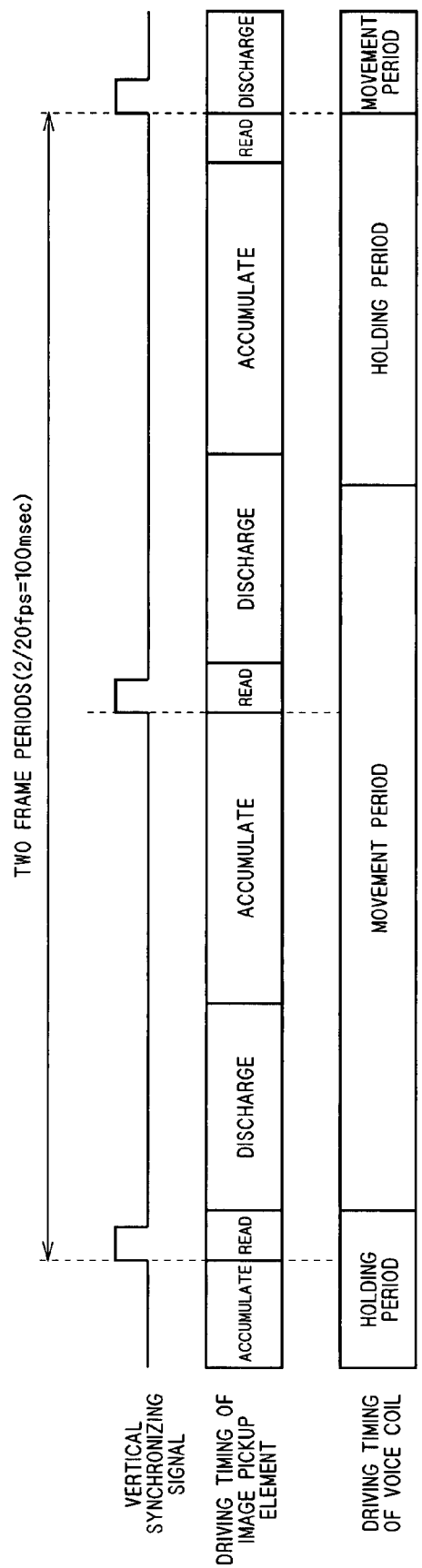
F I G. 1 9

VOICE COIL MOTOR CONTROL DEVICE AND METHOD OF DRIVING THE SAME, IMAGE PICKUP DEVICE

TECHNICAL FIELD

The present invention relates to devices for controlling an optical length and the like between an optical component and an image pickup element, and more specifically to a control device using a voice coil motor.

BACKGROUND ART

Conventional image pickup devices use a stepping motor, a voice coil motor and the like for driving a focus lens, and include a control device for controlling them. Upon driving the focus lens by the stepping motor and the like, the control device exhibits hysteresis characteristics in that the position of the focus lens varies with drive directions. In a patent document 1, therefore, focus suffering from hysteresis characteristics is corrected by driving a focus lens in a U-turn such that a drive direction in which a maximum focus evaluation value has been detected coincides with a drive direction for moving the focus lens to a focus position, and detecting a maxim focus evaluation value again. This prevents a control device from being affected by hysteresis characteristics in the patent document 1.

Also, a control device for an image pickup device disclosed in a patent document 2 includes a faint vibration waveform generator for generating a signal that faintly vibrates a movable part of a voice coil motor steadily, and an amplitude detector for detecting the amplitude of the movable part. This control device adjusts the amplitude of the signal output from the faint vibration waveform generator based on the output from the amplitude detector, and keeps the amplitude of the movable part constant. This improves the accuracy of focus detection even with load variation.

Patent document 1: Japanese Patent Application Laid-Open No. 8-186752 (p. 11, FIG. 12)

Patent document 2: Japanese Patent Application Laid-Open No. 8-98575 (p. 6, FIG. 1)

However, it takes time to attain focus with the control device for a voice coil motor and the like disclosed in the patent document 1 because the focus lens always has to coincide with the drive direction in which a maximum focus evaluation value has been detected, and the lens is stopped upon confirming a maximum focus evaluation value again, in order to avoid the effects of hysteresis characteristics.

In addition, the control device that faintly vibrates the movable part of the voice coil motor disclosed in the patent document 2 requires a complicated control system because the amplitude needs to be kept constant by using a detector for detecting the amplitude of a faint vibration period from a signal.

DISCLOSURE OF INVENTION

The present invention has been made to solve the problems such as described above, and has an object to provide a control device capable of improving hysteresis characteristics of a voice coil motor and attaining a suitable lens position without complicating the structure of the control device.

The present invention also has an object to provide a control device capable of shortening time necessary for movement, thereby shortening focusing time while improving hysteresis characteristics of the voice coil motor.

As solving means of the invention, a voice coil motor control device performing drive control of a voice coil motor includes: a driving current control part for controlling a driving current supplied to the voice coil motor in accordance with a driving pulse subjected to pulse width modulation; and a driving pulse control part for dividing a drive period of the voice coil motor into a movement period and a holding period, and controlling the driving pulse by changing a duty ratio of the driving pulse during the movement period from a duty setting value and fixing the duty ratio of the driving pulse during the holding period to the duty setting value.

The voice coil motor control device divides the drive period into the movement period and holding period, and changes the duty ratio of the driving pulse during the movement period in accordance with the duty setting value. Accordingly, hysteresis characteristics of the voice coil motor are improved, and a suitable position for the lens can be controlled as a lens control device of the image pickup element without complicating the control system. Further, the voice coil motor control device does not detect an evaluation value again by driving the focus lens in a U-turn, thereby shortening focusing time. Further, an image pickup device using the voice coil motor control device according to the invention improves different hysteresis characteristics depending on the orientation of the image pickup device. Moreover, with the voice coil motor control device according to the invention, an image pickup device can be made with autofocus control for an open loop system without having to use a sensor for detecting the original position and the like.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram of a focus control part in an image pickup device using a voice coil motor control device according to a first preferred embodiment of the present invention.

FIG. 6 illustrates a look-up table of the voice coil motor control device according to the first preferred embodiment.

FIG. 17 is a flow diagram for detecting a maximum value for autofocus using the voice coil motor control device according to the second preferred embodiment.

FIGS. 18 and 19 are timing charts of an image pickup element and the voice coil motor control device according to the second preferred embodiment.

BEST MODES FOR CARRYING OUT THE INVENTION

First Preferred Embodiment

Figure 2:
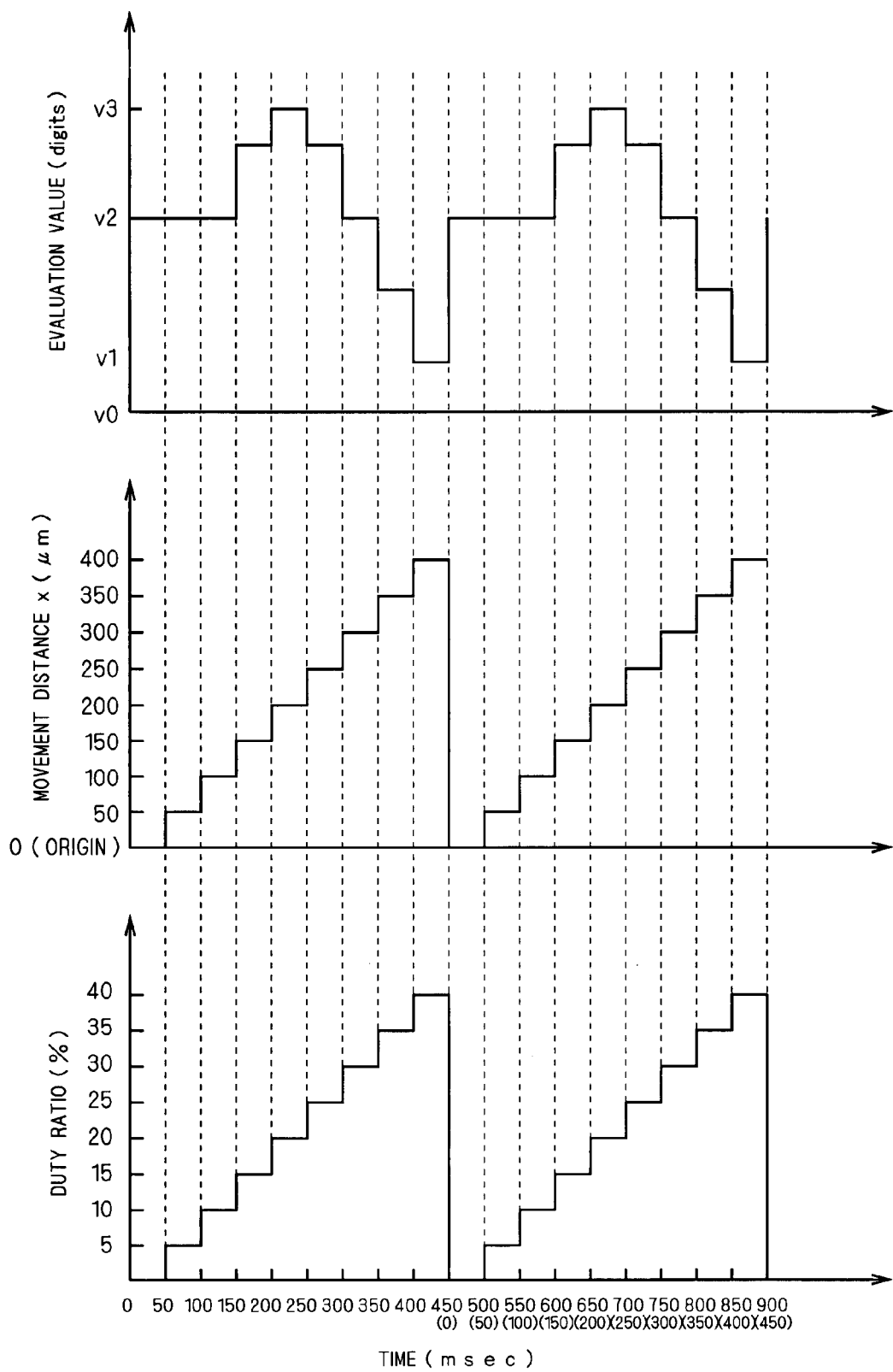
FIG. 2 shows the relationships between time and a duty ratio and the like of the voice coil motor control device according to the first preferred embodiment.

FIG. 1 is a block diagram of a focus control part in an image pickup device using a voice coil motor control device according to a first preferred embodiment of the present invention. The focus control part includes a lens 1 on an optical axis 131, an image pickup element 3, and a voice coil motor 31. The voice coil motor 31 is connected to a voice coil motor control device 30, and moves the lens 1 in the direction of the optical axis 131. The lens 1 moves away from the image pickup element 3 in a forward direction or moves closer to the image pickup element 3 in a reverse direction, with a movement distance x from the original position. The lens 1 is at the original position with respect to the image pickup element 3 when an infinite distance is focused, or when pan focus is attained.

How to drive the voice coil motor 31 is explained by taking typical pulse width modulation drive as an example. The voice coil motor control device 30 according to the invention may perform other drives than the pulse width modulation drive. The pulse width modulation drive controls a driving current supplied to the voice coil motor 31 by changing the duty ratio (ON/OFF) of a driving pulse. FIG. 2 shows graphs indicating the relationships between time and a duty ratio, the movement distance x, and an evaluation value with this drive. The evaluation value represents a detection result of the focus state of a subject.

In the bottom graph of FIG. 2, the horizontal axis represents time (msec) and the vertical axis represents a duty ratio (%) of the pulse width modulation drive. In the middle graph, the horizontal axis represents time (msec) and the vertical axis represents the movement distance x (μm) by the pulse width modulation drive. The movement distance x (μm) is determined by a driving current that is averaged by the conditions of the pulse width modulation drive and the load conditions of the voice coil motor 31. In the top graph, the horizontal axis represents time (msec) and the vertical axis represents an evaluation value (digits) obtained by an image pickup signal from the image pickup element 3.

Referring to FIG. 2, the lens 1 is at the original position (x=0) as of 0 msec when the voice coil motor control device 30 is not driven. As of 50 msec when the voice coil motor control device 30 is driven with a duty ratio of 5%, the movement distance x of the lens 1 becomes 50 μm. After that, the duty ratio is increased by 5% with each drive period of 50 msec in a like manner. Each time the duty ratio increases by 5%, the movement distance x of the lens 1 increases by 50 μm.

In FIG. 2, the drive period is marked off at 50-msec intervals. Such adjustment is made so that one drive period corresponds to one frame rate of 20 fps of the image pickup device according to this embodiment. The marking width of the movement distance x and the starting time of movement for the lens 1 shown in FIG. 2 may vary depending on the static and kinetic friction coefficients of the voice coil motor 31, and the initial state and the like of the voice coil motor 31.

As of 200 msec with a duty ratio of 20%, the movement distance x of the lens 1 is 200 μm. The image pickup device according to this embodiment achieves focus at this movement distance of 200 μm. Accordingly, the evaluation value becomes a maximum value (V3) at this point. As the time passes from 250 msec to 450 msec, the duty ratio increases from 25% to 40%, which involves an increase in the movement distance x of the lens 1 from 250 μm to 450 μm. As the movement distance x of the lens 1 increases, the lens 1 falls out of the focus position, causing the evaluation value to decrease from V3 to V1. As of 0 msec, the evaluation value is relatively high at V2 because the lens 1 is at the original position focusing on an infinite distance.

In the FIG. 2 example, the lens 1 returns to the original position of x=0 as of 450 msec. Numbers within parentheses in the time axis indicate values by resetting the time to 0 msec as of 450 msec. As of 500 msec, therefore, the voice coil motor control device 30 is driven with a duty ratio of 5% and the movement distance x of the lens 1 is 50 μm. After that, the duty ratio is increased by 5% with each drive period in a like manner. Each time the duty ratio increases by 5%, the movement distance x of the lens 1 increases by 50 μm.

In such ways, the pulse width modulation drive controls the voice coil motor 31 to move the lens 1 by adjusting the duty ratio. The image pickup device is capable of controlling the focus by detecting the evaluation value.

Figure 3:
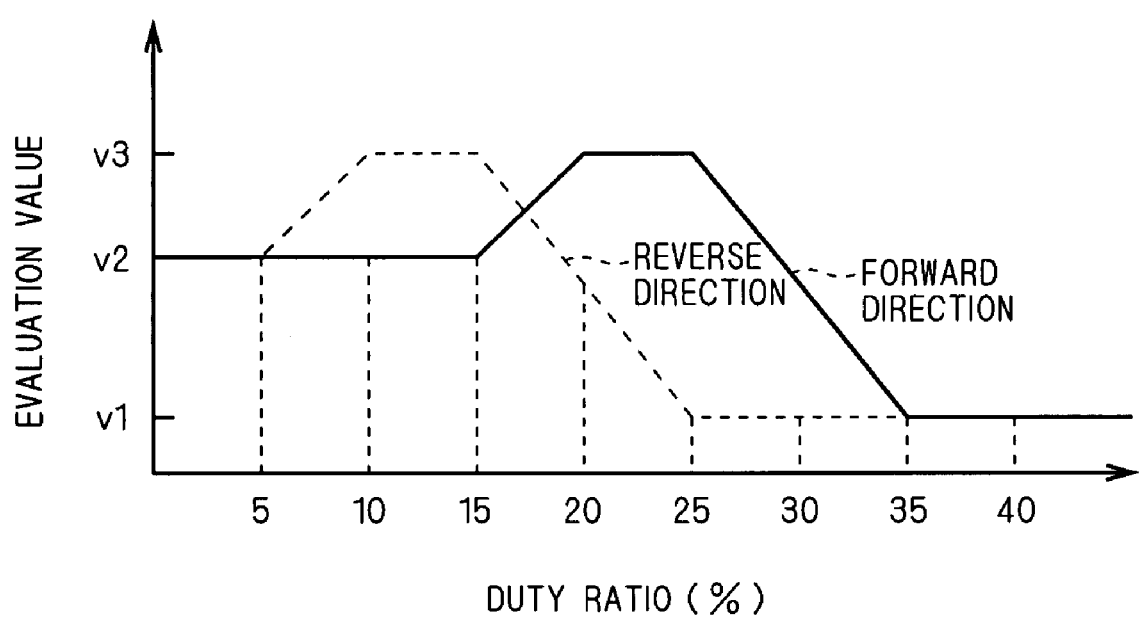
FIG. 3 depicts the relationship between a duty ratio and an evaluation value of the voice coil motor control device according to the first preferred embodiment.

FIG. 3 depicts the relationship between the evaluation value and the duty ratio shown in FIG. 2. In FIG. 3, the horizontal axis represents the duty ratio (%) and the vertical axis represents the evaluation value. The lens 1 first moves in the forward direction from the original position (with a duty ratio of 0% and a movement distance x of 0 μm), and comes to rest at the end position (with a duty ratio of 40% and a movement distance of 450 μm). The end position is determined with system specifications, and could be any value. When the lens 1 moves in the forward direction, the evaluation value becomes the maximum value V3 with a duty ratio from 20 to 25% as depicted by solid lines in FIG. 3.

Although not shown in FIG. 2, when the lens 1 returns from the end position to the original position, the evaluation value becomes the maximum value V3 with a duty ratio from 10 to 15% as indicated by dashed lines in FIG. 3. Namely, upon moving the lens 1 by driving the voice coil motor 31, the voice coil motor control device 30 exhibits hysteresis characteristics in that the focus position varies between the forward direction and the reverse direction, as depicted in FIG. 3.

Figure 4:
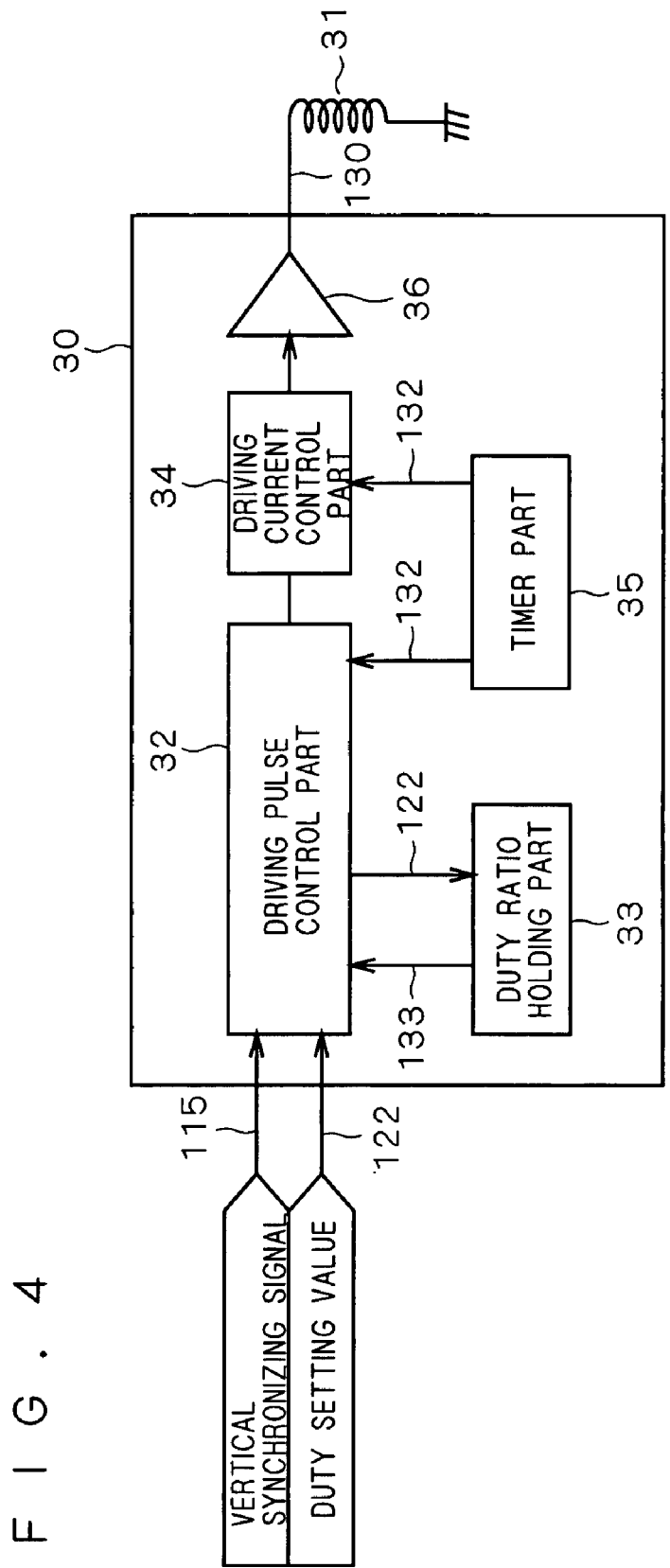
FIG. 4 is a block diagram of the voice coil motor control device according to the first preferred embodiment.

To improve hysteresis characteristics, the voice coil motor control device 30 according to this embodiment has the following structure. FIG. 4 illustrates the structure of the voice coil motor control device 30. Input to the voice coil motor control device 30 are a vertical synchronizing signal 115 indicating one frame period of the image pickup device, and a duty setting value 122 serving as a duty ratio for setting a desired movement distance. Further, each drive period of the voice coil motor control device 30 is divided into a movement period during which the lens 1 moves, and a holding period during which the lens 1 is held at a fixed position.

The voice coil motor control device 30 includes a driving pulse control part 32 for outputting a driving pulse that changes the duty ratio of the duty setting value 122 in the movement period, and a duty ratio holding part 33 for generating the amount of change 133 in duty ratio in the movement period and supplying the amount of change 133 to the driving pulse control part 32. The voice coil motor control device 30 further includes a driving current control part 34 for controlling a driving current supplied to the voice coil motor 31 based on the driving pulse from the driving pulse control part 32, and a timer part 35 for supplying timing signals 132 that control timings of the driving pulse control part 32 and the driving current control part 34. The output from the driving current control part 34 is supplied as a voice coil driving signal 130 to the voice coil motor 31 via a driver 36.

Figure 5:
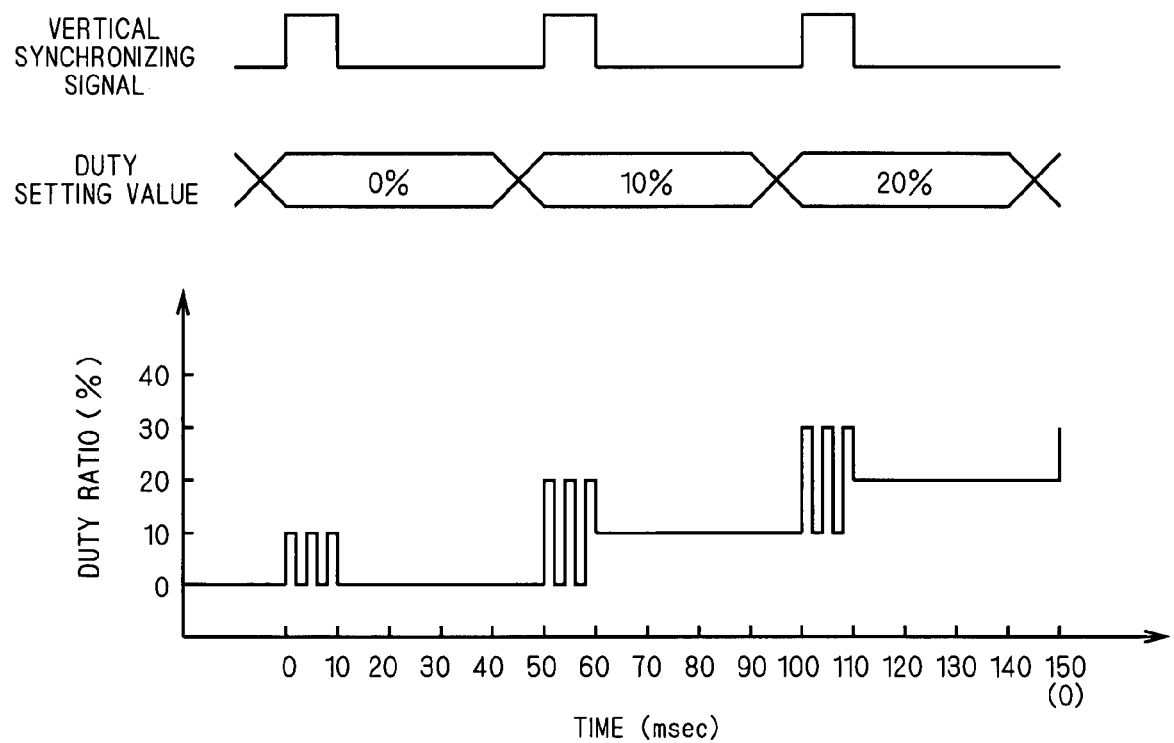
FIG. 5 depicts the relationship between time and a duty ratio and the like of a voice coil driving signal according to the first preferred embodiment.

FIG. 5 shows a waveform indicating the relationship between the duty ratio of the voice coil driving signal 130 and time. In FIG. 5, the horizontal axis represents time (msec) and the vertical axis represents the duty ratio (%). Also shown in FIG. 5 are the vertical synchronizing signal 115 and the duty setting value 122. The duty setting value 122 is illustrated with respect to the vertical synchronizing signal 115, and is adjusted in synchronization with the vertical synchronizing signal 115.

FIG. 6 illustrates a look-up table (LUT) indicating data construction in the duty ratio holding part 33. In FIG. 6, the movement period is divided into n periods for each duty ratio setting value 122, and the amount of change 133 in duty ratio from the first period through the n-th period is indicated by an amplitude ΔD (%) and time δT (msec). The duty ratio holding part 33, which generates the amount of change 133 in accordance with the rules of the LUT based on the duty setting value 122, requires no special hardware or software. While the duty ratio holding part 33 uses the LUT, the amount of change 133 in duty ratio may be generated in a like manner by constructing logic with hardware or software. The amplitude ΔD, time δT, and the number (period) n are adjusted in consideration of the load conditions of a control system, hysteresis characteristics, and resonance characteristic.

Figure 7:
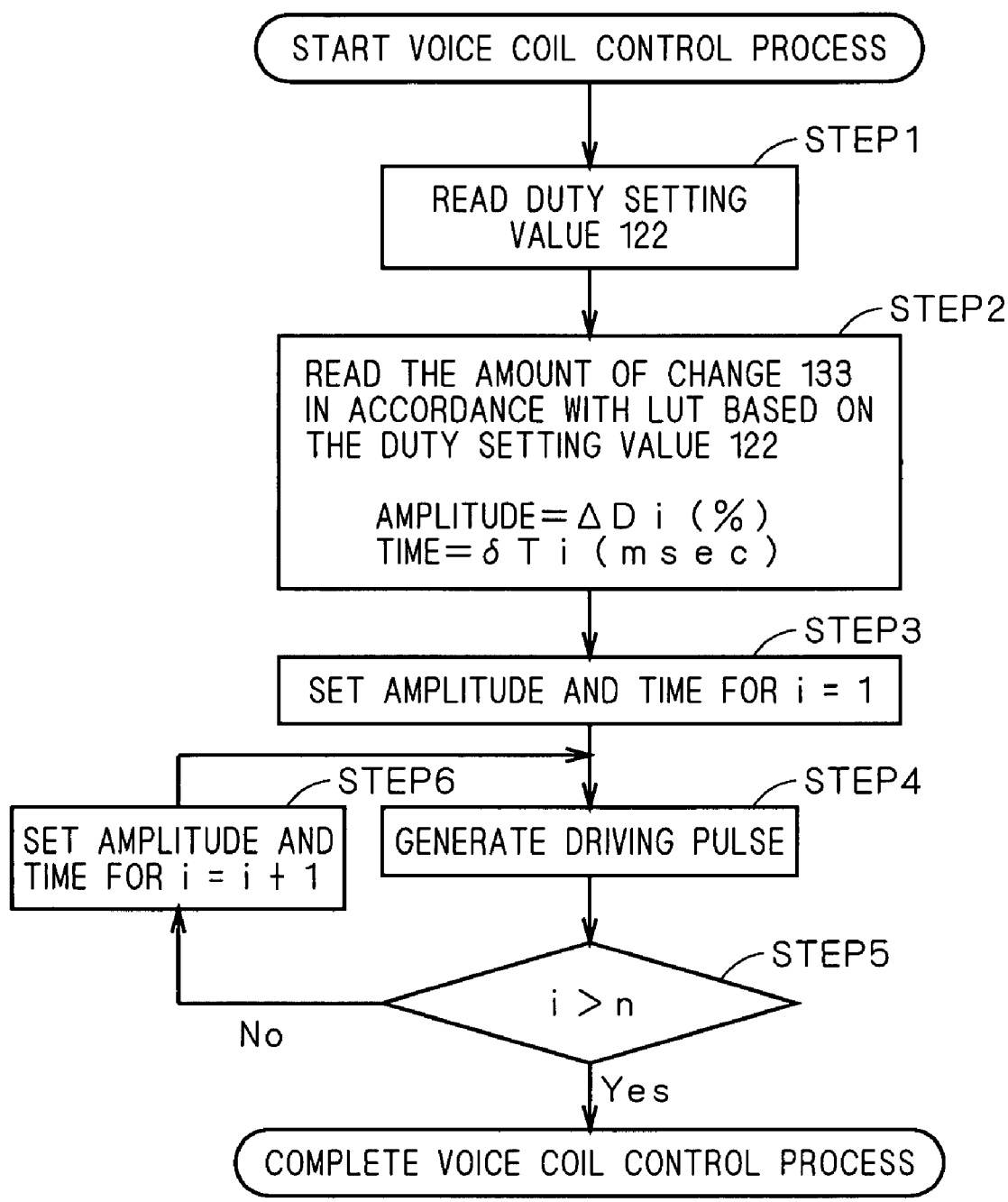
FIG. 7 is a flow diagram for setting a duty ratio of the voice coil motor control device according to the first preferred embodiment.

FIG. 7 is a flowchart for generating the voice coil driving signal 130 shown in FIG. 5 by the voice coil motor control device 30. The sign "n" in FIG. 7 means the "n" periods that form the movement period. The value n may be a constant in the driving pulse control part 32 or the duty ratio holding part 33, or may be set in a CPU part 24 shown in FIG. 15.

Referring to FIGS. 5 through 7, drive of the voice coil motor control device 30 according to this embodiment will be specifically described. First, in Step 1 of FIG. 7, the driving pulse control part 32 reads the duty setting value 122 supplied from the CPU part 24. Namely, the driving pulse control part 32 reads the duty setting value 122 with a duty ratio of 0% in FIG. 5.

In Step 2, the driving pulse control part 32 reads, in accordance with the duty setting value 122, the amount of change 133 in duty ratio from the first period (i=1) through the n-th period (i=n) of the movement period from the duty ratio holding part 33. In the FIG. 5 example, n is 5 and the movement period is made of a first period through a fifth period. And with the duty ratio of the duty setting value 12 initially being set to 0%, the driving pulse control part 32 refers to a line having a duty setting value of 0% in the LUT shown in FIG. 6, to read the amplitude of the first period: ΔD1=10% and time: δT1=2 msec, the amplitude of the second period: ΔD2=0% and time: δT2=2 msec, the amplitude of the third period: ΔD3=10% and time: δT3=2 msec, the amplitude of the fourth period: ΔD4=0% and time: δT4=2 msec, the amplitude of the fifth period: ΔDS=10% and time: δT5=2 msec.

Next, the driving pulse control part 32 sets the amplitude and time for the first period of the movement period based on the read amount of change 133 in duty ratio (Step 3). The driving pulse control part 32 then detects the leading edge of the vertical synchronizing signal 115, and generates a driving pulse with a duty ratio of 10% during the first period (from 0 msec to 2 msec) based on the timing signal 132 marked off at 1-msec intervals from 0 msec from the timer part 35 (Step 4). Because the first period (i=1) is n or less (n=5, for example), processing then goes to Step 6. Then, the driving pulse control part 32 sets the amplitude and time for the second period (i=2) increased by 1 from the first period (i=i+1) based on the read amount of change 133 in duty ratio (Step 6).

Processing then goes to Step 4, where the driving pulse control part 32 detects the leading edge of the vertical synchronizing signal 115, and generates a driving pulse with a duty ratio of 0% during the second period (from 2 msec to 4 msec) based on the timing signal 132 marked off at 1-msec intervals from 0 msec from the timer part 35 (Step 4). After that, processing from Step 4 through Step 6 is repeated until the i-th period becomes larger than n.

In the above example, the driving pulse control part 32 generates a driving pulse with a duty ratio of 10% during the third period (from 4 msec to 6 msec), 0% during the fourth period (from 6 msec to 8 msec), and 10% during the fifth period (8 msec to 10 msec). When the i-th period becomes larger than n, the voice coil motor control process is completed.

During the holding period (the remaining time of one frame (from 10 msec to 50 msec)) after the completion of the fifth period of the movement period, the driving pulse control part 32 performs pulse width modulation drive with the duty setting value 122 having a duty ratio of 0%.

In the next frame, the CPU part 24 supplies the duty setting value 122 having a duty ratio of 10%. The driving pulse control part 32 refers to a line having a duty setting value of 10% in FIG. 6, to read the amount of change 133 of the amplitude of the first period: ΔD1=10% and time: δT1=2 msec, the amplitude of the second period: ΔD2=−10% and time: δT2=2 msec, the amplitude of the third period: ΔD3=10% and time: δT3=2 msec, the amplitude of the fourth period: ΔD4=−10% and time: δT4=2 msec, the amplitude of the fifth period: ΔD5=10% and time: δT5=2 msec. Then, the driving pulse control part 32 sets duty ratios for the first through fifth periods of the movement period based on the read amount of change 133, and performs pulse width modulation drive as described above.

Figure 8:
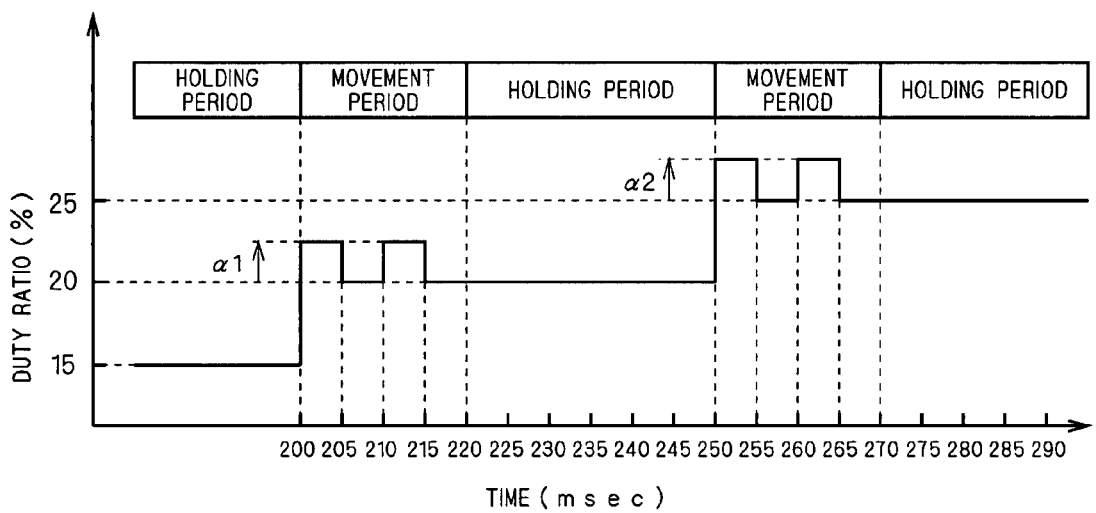
FIG. 8 depicts the relationship between time and a duty ratio of the voice coil driving signal according to the first preferred embodiment.

The waveform indicating the relationship between the duty ratio of the voice coil driving signal 130 and time is described in further detail. FIG. 8 depicts a waveform during a period from 200 msec to 290 msec, which is obtained by applying the driving method according to this embodiment to the waveform shown in FIG. 2. Fifty msec from 200 msec to 250 msec forms a vertical synchronizing period corresponding to one frame (one frame period) that includes the movement period and the holding period. In the FIG. 8 waveform, a period from 200 msec to 220 msec is the movement period, and a period from 220 msec to 250 msec is the holding period. The duty setting value 122 supplied to the driving pulse control part 32 has a duty ratio of 20%.

In the FIG. 8 waveform, pulse width modulation drive is performed by not using the LUT shown in FIG. 6 but with the amount of change 133 of the amplitude of the first period: $\Delta D1 = \alpha 1$ and time: $\delta T1 = 5$ msec, the amplitude of the second period: $\Delta D2 = 0\%$ and time: $\delta T2 = 5$ msec, the amplitude of the third period: $\Delta D3 = \alpha 1$ and time: $\delta T3 = 5$ msec, the amplitude of the fourth period: $\Delta D4 = 0\%$ and time: $\delta T4 = 5$ msec. In the FIG. 8 waveform, namely, a stepped vibration process is performed such that the duty ratio has the amplitude $\alpha 1$ during a period from 200 msec to 205 msec and a period from 210 msec to 215 msec.

The adjustment to the duty setting value 122 is equivalent to the adjustment to the movement distance in the FIG. 8 waveform too. Accordingly, when the duty setting value 122 has a duty ratio of 20% during the holding period from 220 msec to 250 msec, the lens 1 is held at a position of movement distance of 200 µm. The movement period is determined by the sum total ($\Sigma \delta Tn$) of the times $\delta Tn$ of the respective periods.

The duty setting value 122 has a duty ratio of 25% during a subsequent period from 250 msec, and a stepped vibration process is performed such that the duty ratio has an amplitude $\alpha 2$ during a period from 250 msec to 255 msec and a period from 260 msec to 265 msec in the movement period. A movement period from 250 msec to 270 msec and a holding period from 270 msec to 300 msec form one drive period.

The amplitude $\alpha 2$ shown in FIG. 8 may have the same or different magnitude as the amplitude $\alpha 1$. When the duty setting value 122 has a duty ratio other than 20% and 25% shown in the FIG. 8 waveform, processing is performed with the application of similar amplitude. With the application of amplitude to the duty ratio of the duty setting value 122 during the movement period as in the FIG. 8 waveform, the voice coil motor 31 moves swiftly from a static friction state to a kinetic friction state, thereby reducing hysteresis characteristics.

Figure 9:
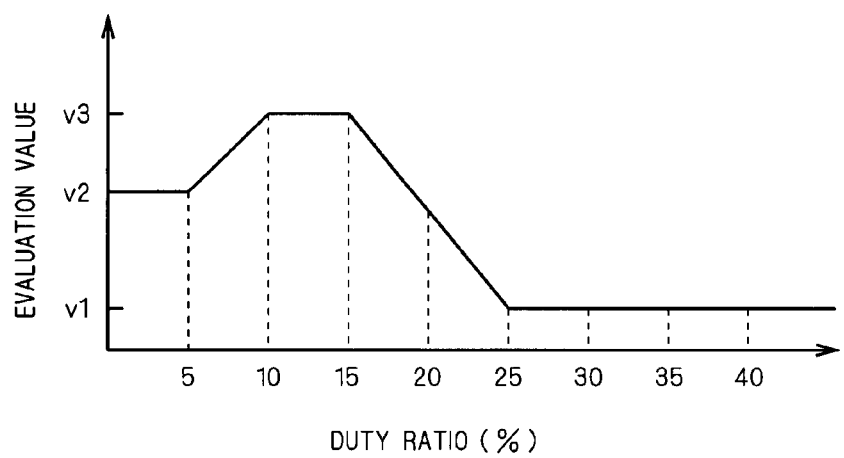
FIG. 9 depicts the relationship between a duty ratio and an evaluation value of the voice coil motor control device according to the first preferred embodiment.

In the waveform depicted in FIG. 8, amplitude is applied twice during the period from 200 msec to 205 msec and the period from 210 msec to 215 msec. Yet the number of amplitude applications may take any number depending on the load conditions of the voice coil motor 31 and time allocated to the movement period. In addition, the amplitudes $\alpha 1$ and $\alpha 2$ take any positive or negative number. FIG. 9 depicts the relationship between the evaluation value and the duty ratio as a result of supplying the voice coil driving signal 130 subjected to the stepped vibration process shown in FIG. 8 to the voice coil motor 31. Unlike FIG. 3, FIG. 9 shows the same profile between the forward and reverse directions, which indicates improved hysteresis characteristics.

Figure 10:
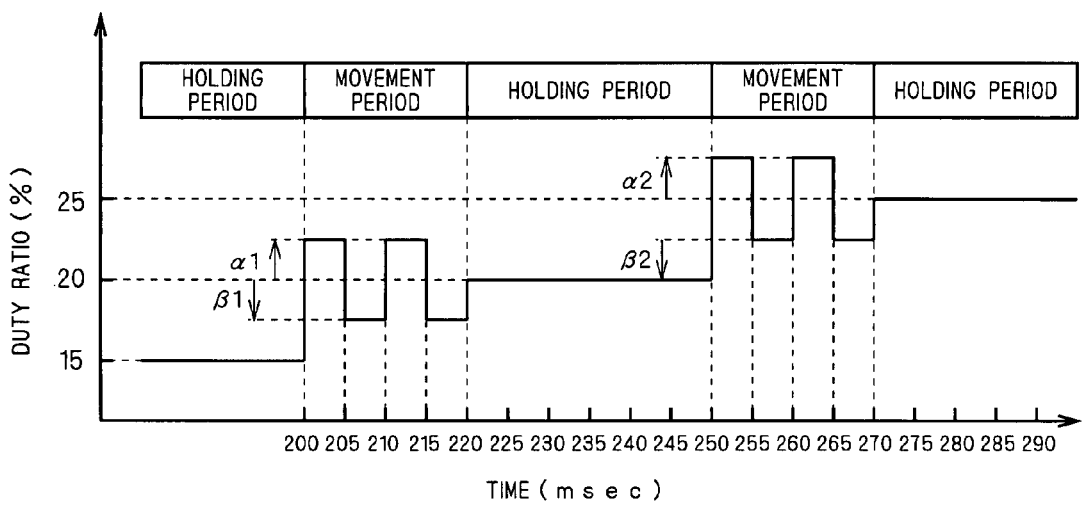
FIGS. 10 to 13 depict the relationships between time and a duty ratio of the voice coil driving signal according to the first preferred embodiment.

FIG. 10 shows a waveform with a different stepped vibration process from FIG. 8. Namely, in FIG. 10, a stepped vibration process is performed such that the duty ratio has an amplitude $\beta 1$ during a period from 205 msec to 210 msec and a period from 215 msec to 220 msec, and the duty ratio has an amplitude $\beta 2$ during a period from 255 msec to 260 msec and a period from 265 msec to 270 msec. In the FIG. 10 waveform, amplitude can be applied with the added amount of $\alpha 1 + \beta 1$, thereby reducing the dynamic range of amplitude compared to the FIG. 8 waveform. This also results in power savings of the voice coil motor control device 30.

Figure 11:
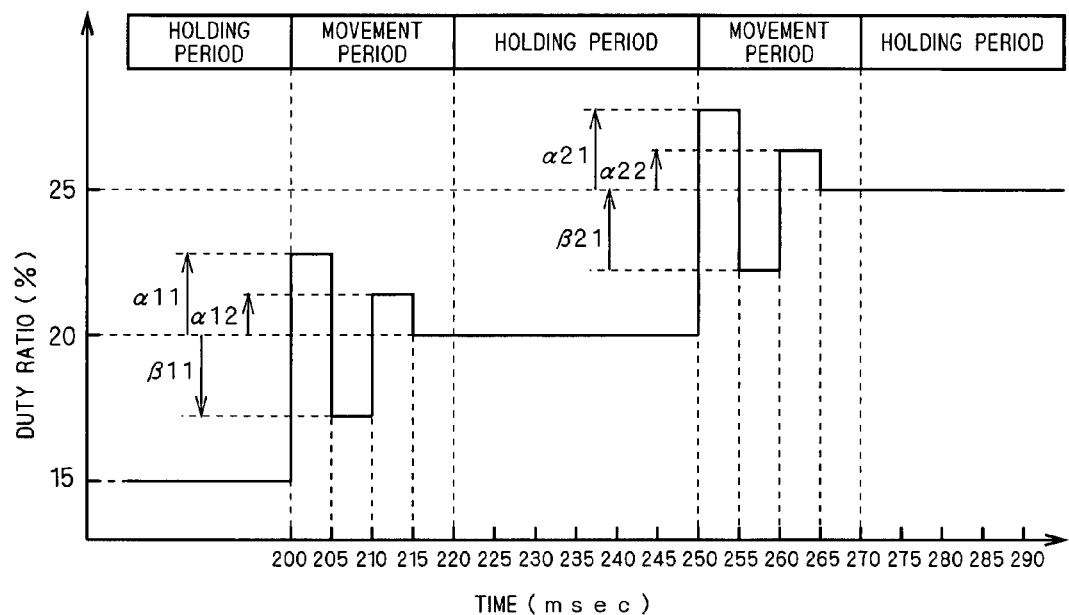

FIG. 11 also shows a waveform with a different stepped vibration process from FIG. 8. Namely, in FIG. 11, the amplitude is modulated during the same movement period such that the amplitude becomes $\alpha 11$ during a period from 200 msec to 205 msec, $\beta 11$ during a period from 205 msec to 210 msec, $\alpha 12$ during a period from 210 msec to 215 msec, and zero during a period from 215 msec to 220 msec. In the FIG. 11 waveform, the amplitude is modulated during the same movement period, thereby reducing time during which the duty ratio of the holding period converges to the duty ratio set by the duty setting value 122.

Figure 12:
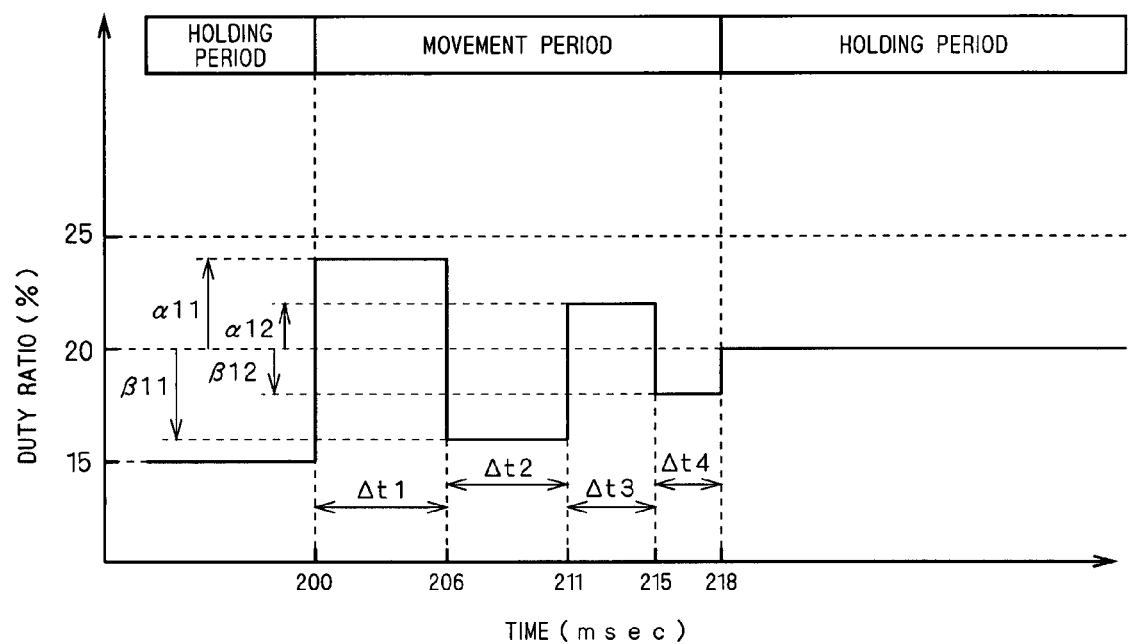

FIG. 12 shows a waveform different from FIG. 11, which is obtained by further modulating time intervals during the same movement period. More specifically, in FIG. 12, the amplitude is set to $\alpha 11$ during a period from 200 msec to 206 msec ($\Delta t1$), $\beta 11$ during a period from 206 msec to 211 msec ($\Delta t2$), $\alpha 12$ during a period from 211 msec to 215 msec ($\Delta t3$), and $\beta 12$ during a period from 215 msec to 218 msec ($\Delta t4$). Namely, in the FIG. 12 waveform, amplitude of large magnitude is applied for a long time in an initial static friction state, and amplitude of small magnitude is applied for a short time before a change to the holding period. By driving the voice coil motor 31 in this manner, the movement period can be shortened.

Figure 13:
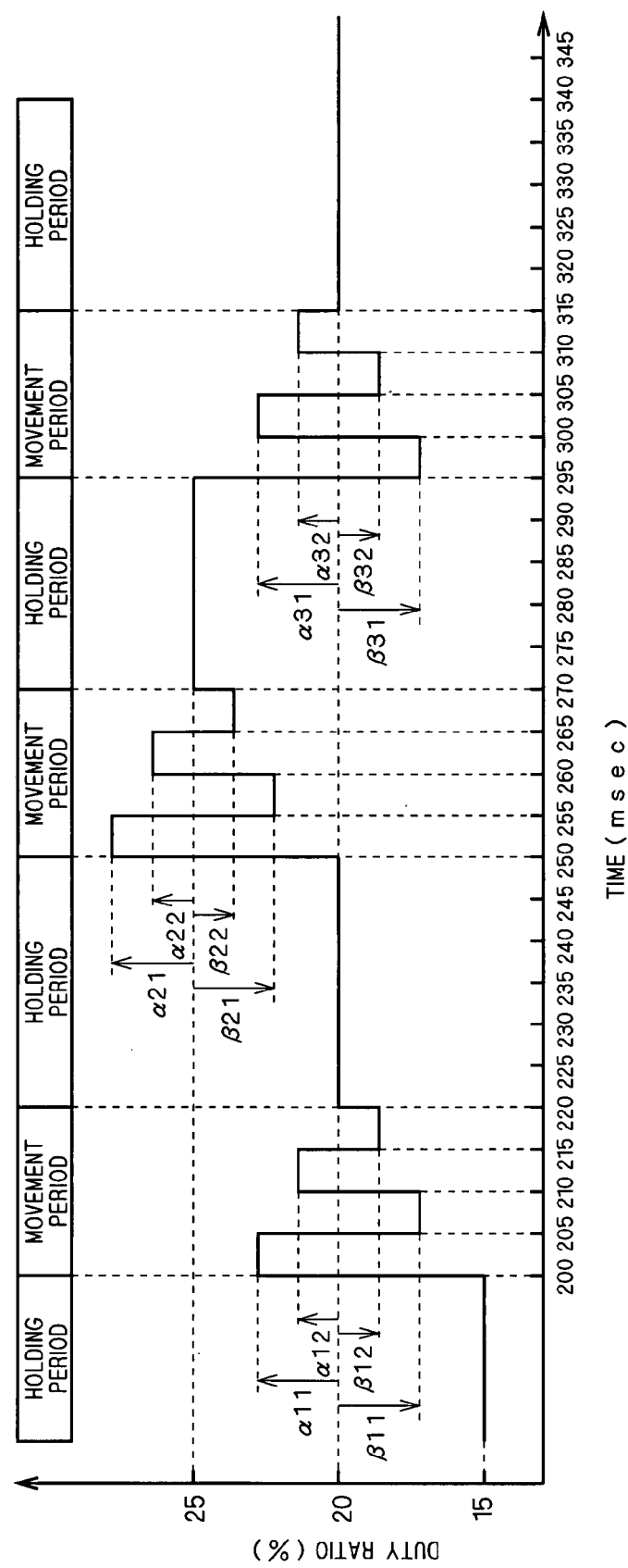

In a waveform shown in FIG. 13, the duty ratio of the duty setting value 122 varies in amplitude depending on increase or decrease of the duty ratio. First, when the duty ratio of the duty setting value 122 increases (from 20% to 25%, for example) with the lens 1 moving away from the original position (forward direction), amplitude during the first period of the movement period is applied in larger magnitude than the duty ratio of the duty setting value 122. In the FIG. 13 waveform, an amplitude $\alpha 1$ (positive) is applied during a period from 200 msec to 205 msec.

Meanwhile, when the duty ratio of the duty setting value 122 decreases (from 25% to 20%, for example) with the lens 1 moving closer to the original position (reverse direction), amplitude during the first period of the movement period is applied in smaller magnitude than the duty ratio of the duty setting value 122. In the FIG. 13 waveform, an amplitude $\beta 31$ (negative) is applied during a period from 300 msec to 305 msec. In short, in the FIG. 13 waveform, the direction of amplitude during the first period of the movement period is adjusted in the direction of adjustment to the duty setting value 122. Additionally, in FIG. 13, amplitudes $\beta 12$, $\beta 22$ and $\alpha 32$ immediately before the holding period are set to other than zero, thus reducing amplitudes $\alpha 12$, $\alpha 22$ and $\beta 32$ in the direction of lens travel.

Figure 14:
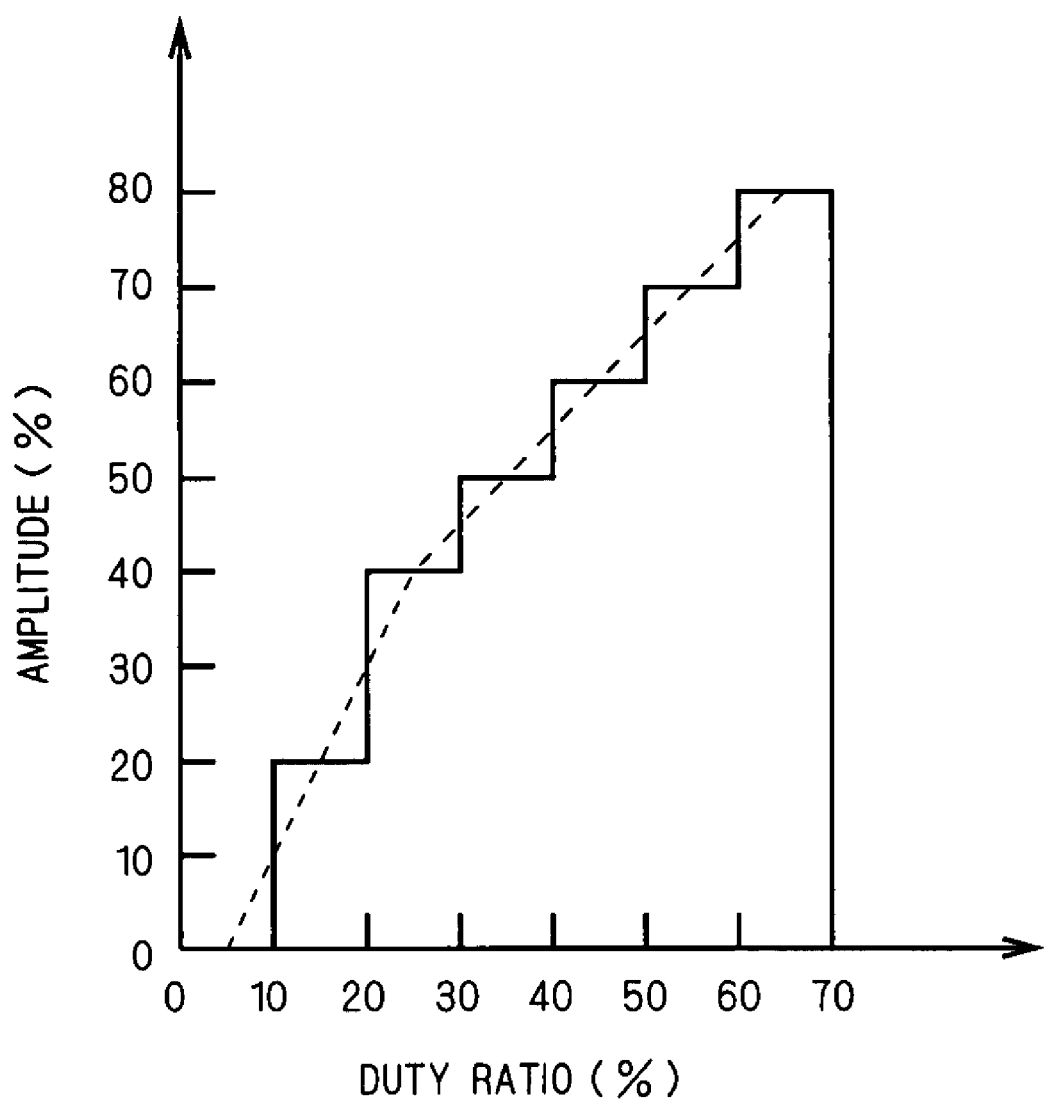
FIG. 14 depicts the relationship between a duty ratio and the amount of amplitude of the voice coil driving signal according to the first preferred embodiment.

Next, the amplitude is varied in accordance with the duty ratio of the duty setting value 122 when moving the lens 1 in the forward direction. FIG. 14 shows the relationship between the duty ratio and amplitude. In FIG. 14, the amplitude is adjusted to 20% with the duty ratio of the duty setting value 122 being from 10 to 20%, 40% with the duty ratio being from 20 to 30%, 20% with the duty ratio being from 30 to 60%, and 10% with the duty ratio being from 60 to 70%. The amplitude is applied in large magnitude with the duty ratio being the median (about from 20 to 60% in FIG. 14) and applied in small magnitude with the duty ratio being high (60% or higher in FIG. 14), thereby preventing excessive movement near the end position. Further, the amplitude is applied in relatively large magnitude (20% in FIG. 14) with the duty ratio being from 10 to 20%, thereby reducing the effect of static friction resistance.

When the duty ratio is low (10%) with the lens 1 moving in the reverse direction or returning to the original position, the amplitude is applied in small magnitude (0 or 10%, for example), thereby preventing excessive movement at the original position by a driving pulse or structural collision sound of the lens 1 at the original position.

As has been described, the method of driving the voice coil motor control device 30 divides the drive period of the voice coil motor 31 into the movement periods and holding periods, and changes the duty ratio of the driving pulse for controlling the driving current based on prescribed standards (the LUT in FIG. 6, for example). With this driving method, hysteresis characteristics of the voice coil motor 31 are improved, and a suitable position for the lens can be controlled as a lens control device of the image pickup element 3. With improved hysteresis characteristics, this driving method negates the need to drive the lens 1 in a U-turn, thereby shortening focusing time.

While the voice coil motor control device 30 according to this embodiment changes the duty ratio during the movement period in a stepped manner, the duty ratio may be gradually changed during the movement period. Further, while the voice coil motor control device 30 according to this embodiment controls the driving current by performing pulse width modulation drive, the driving current may be controlled in other manners.

Second Preferred Embodiment

Figure 15:
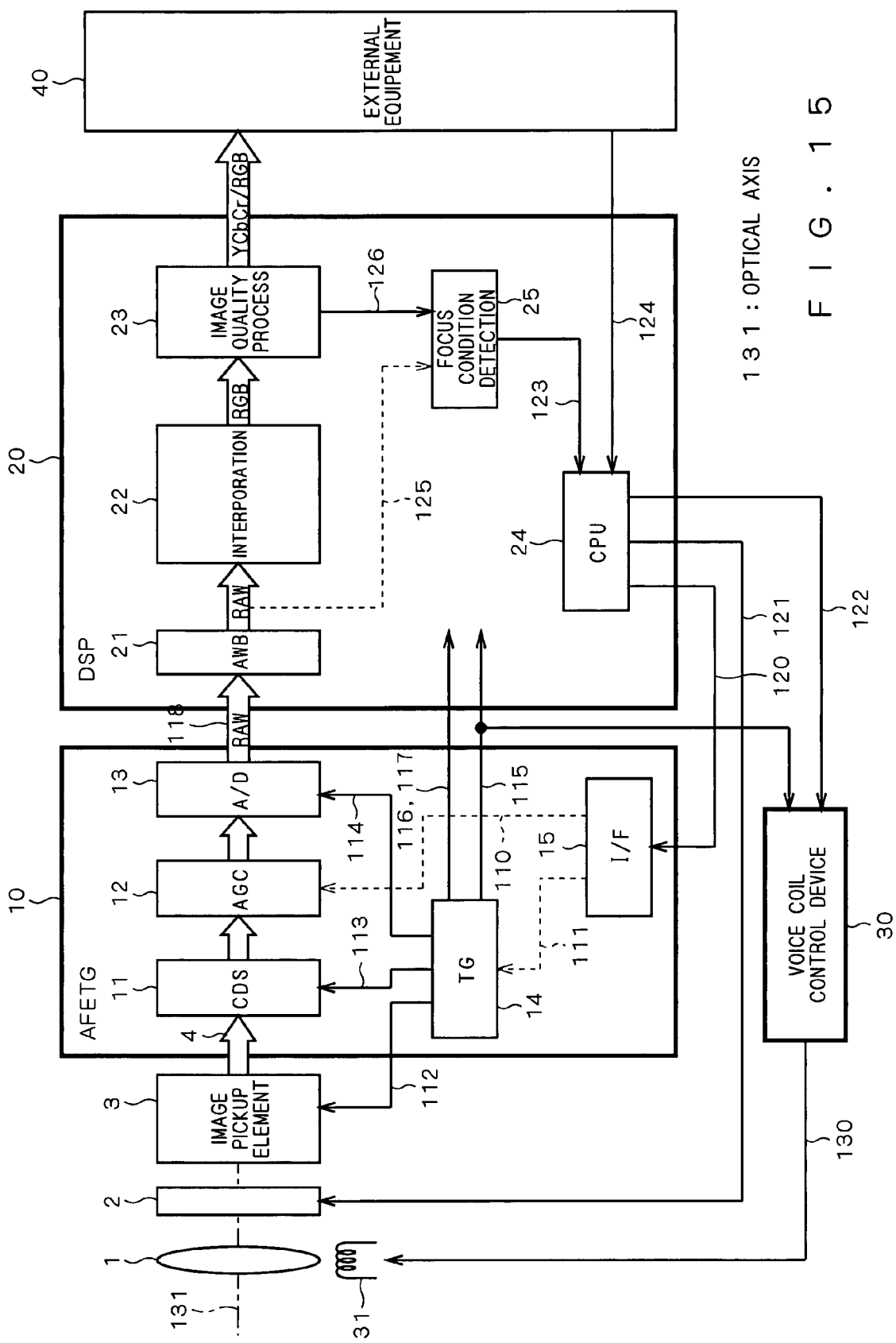
FIG. 15 is a block diagram of an image pickup device using a voice coil motor control device according to a second preferred embodiment of the present invention.

FIG. 15 illustrates the structure of an image pickup device using the voice coil motor control device 30 described in the first preferred embodiment. The image pickup device shown in FIG. 15 has an autofocus feature, and includes the lens 1, an aperture 2, the image pickup element 3, an AFETG part 10, a DSP part 20, the voice coil motor control device 30, the voice coil motor 31, and external equipment 40.

The image pickup element 3 performs photoelectric conversion on incident light from a subject that has passed through the lens 1 and the aperture 2, and outputs the light as an image pickup signal 4. The image pickup signal 4 output from the image pickup element 3 is converted to a RAW signal 118 which is a digital signal at the AFETG part 10. The AFETG part 10 includes a CDS part 11, an AGC part 12, an A/D part 13, a TG part 14, and an I/F part 15.

The CDS part 11 performs a CDS (Correlated Double Sampling) process on the image pickup signal 4 obtained by the image pickup element 3, and extracts image pickup signal components. The AGC part 12 performs analog gain control on the image pickup signal components output from the CDS part 11. The A/D part 13 performs digital conversion on the signal subjected to analog gain control by the AGC part 12, and outputs the RAW signal 118. The TG (Timing Generator) part 14 generates and supplies a driving clock 112 for driving the image pickup element 3, a sample hold pulse 113 to the CDS part 11, and an A/D conversion clock 114 to the A/D part 13. The TG part 14 further generates and supplies a horizontal synchronizing signal 116, an AFETC clock 117 equivalent to the A/D conversion clock 114, and the vertical synchronizing signal 115 to the DSP part 20, and supplies the vertical synchronizing signal 115 to the voice coil motor control part 30. The I/F part 15 receives a control signal 120 from the CPU part 24 in the DSP part 20, and supplies a setting signal 110 for setting the analog gain of the AGC part 12 and a setting signal 111 for setting various kinds of clocks of the TG part 14 based on the control signal 120.

The RAW signal 118 output from the A/D part 13 in the AFETG part 10 is input to the DSP part 20. The DSP part 20 converts the RAW signal 118 to a YCbCr/RGB signal. The DSP part 20 includes an AWB part 21, an interpolation part 22, an image quality processing part 23, the CPU part 24, and a focus condition detection part 25.

The AWB part 21 adjusts the while balance of the RAW signal 118. The interpolation part 22 performs a necessary interpolation process on the RAW signal 118 subjected to the white balance adjustment, and outputs an RGB signal. The image quality processing part 23 performs a matrix process, a YCbCr-conversion process, a coring process and the like on the RGB signal output from the interpolation part 22. The coring processing is a kind of image quality correction processes that reduces noise levels.

The CPU part 24 has a function of controlling the system of the DSP part 20, and the whole of the image pickup device. The focus condition detection part 25 is used with the use of autofocus feature. The CPU part 24 has a function of controlling the duty setting value 122 supplied to the voice coil motor control device 30 based on an evaluation value 123 from the focus condition detection part 25. The focus condition detection part 25 passes a signal before the interpolation process by the interpolation part 22 and a signal 126 after the interpolation process and image process through an HPF (High Pass Filter) that cuts off a specific frequency, and outputs the resultant sum total during a prescribed period such as one frame period as the evaluation value 123. The focus condition detection part 25 may have a plurality of cutoff characteristics of the HPF. With a plurality of cutoff frequencies, the focus condition detection part 25 can detect an optimum focus condition.

The voice coil motor 31 is driven by the voice coil driving signal 130 subjected to pulse width modulation (to a frequency of 20 KHz, for example) that is supplied from the voice coil motor control device 30. A driving current value for the voice coil motor 31 can be adjusted by adjusting the duty ratio of the voice coil driving signal 130. The voice coil motor 31 controls a distance on the optical axis 131 between the lens 1 and the image pickup element 3 in accordance with the driving current value. With such control, an image pickup distance of a subject can be controlled such as an adjustment from distance to macro, or a focus position can be controlled.

A distance on the optical axis 131 between the lens 1 and the image pickup element 3 is controlled by driving the voice coil motor 31. As the distance on the optical axis 131 changes, the degree of focus changes, which involves a change in evaluation value 123. The CPU part 24 detects the evaluation value 123 output from the focus condition detection part 25 while controlling the duty setting value 122 of the voice coil motor control device 30, to determine the duty setting value 122 where the evaluation value 123 becomes maximum. Consequently, the image pickup device can implement autofocus.

The image quality processing part 23 outputs the YCbCr/RGB signal to the external equipment 40. The external equipment 40 displays the YCbCr/RGB signal on a display part (not shown), or accumulates the YCbCr/RGB signal in a storage part (not shown). The external equipment 40 also supplies a necessary control signal 124 to the CPU part 24. The CPU part 24 further supplies a signal 121 for controlling the aperture 2.

Figure 16:
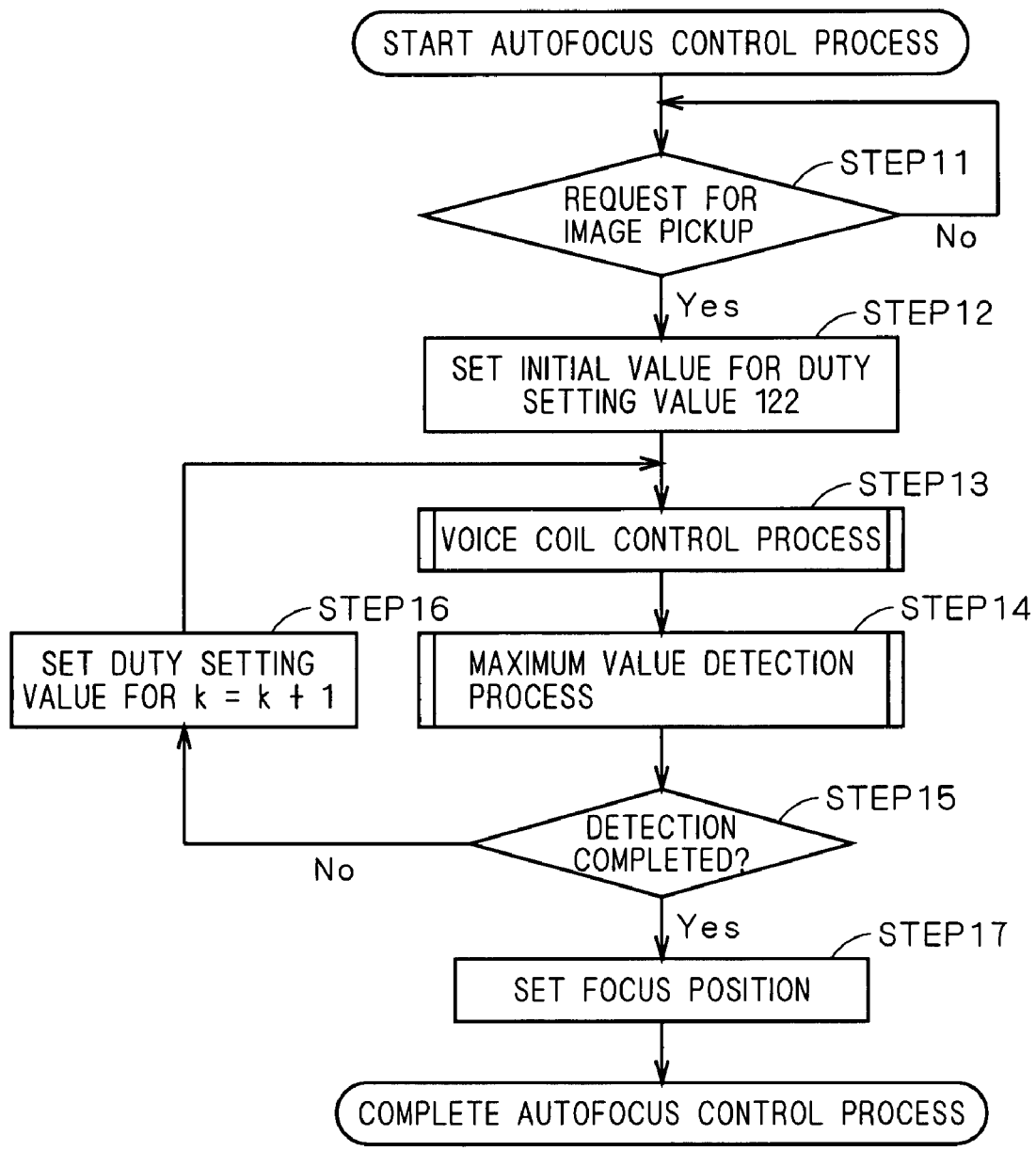
FIG. 16 is a main flow diagram of an autofocus process using the voice coil motor control device according to the second preferred embodiment.

Referring to FIGS. 16 and 17, a process flow of autofocus by the image pickup device using the voice coil motor control device 30 will be explained. FIG. 16 illustrates a main flow in the process flow. FIG. 17 illustrates a maximum value detection process in the process flow.

In FIG. 16, upon turn-on of the image pickup device, a process is performed that awaits a request for image pickup (Step 11). A button for image pickup by a user is provided for the external equipment such as a mobile telephone or a digital camera into which the image pickup device according to the invention is incorporated. With the push of the button by the user, a request for image pickup is made, causing the DSP part 20 to set the duty setting value 122 (Step 12). Then, the voice coil motor control device 30 starts a voice coil motor control process (Step 13).

Next, the focus condition detection part 25 performs a maximum value detection process for the evaluation value 123 (Step 14). When the maximum value is not obtained in Step 15, processing goes to Step 16. When the maximum value is obtained, processing goes to Step 17. In Step 17, the CPU part 24 sets a new duty setting value 122, to return to Step 13. After Step 17, the focus condition detection part 25 sets a focus position in accordance with a duty ratio where the evaluation value 123 becomes maximum, and then completes the autofocus control process.

The maximum value detection process in Step 14 is described with reference to FIG. 17. First, the maximum value detection process is performed up to a maximum value of the duty ratio (40% in the case of FIG. 2) for autofocus that is set in advance in the CPU part 24, to read the evaluation value 123 during the process (Step 21). The evaluation value 123 read in Step 21 is compared to the maximum evaluation value (Step 22). When the read evaluation value 123 is larger, the read evaluation value 123 replaces the maximum evaluation value (Step 23). When the read evaluation value 123 is smaller, the maximum evaluation value is maintained. With such maximum value detection process, a maximum value can always be detected for the evaluation value 123. The initial value for the maximum evaluation value 123 is set to zero.

Upon detecting the maximum evaluation value, a duty ratio is set that corresponds to the focus position as described above (In the case of FIG. 2 where the evaluation value becomes the maximum value V3 with the duty ratio being 20%, the duty ratio is set to 20%). Consequently, the image pickup device can implement the autofocus feature.

FIG. 18 depicts driving timing of the image pickup element 3 and driving timing of the voice coil motor 31. In the driving timing of the image pickup element 3, one frame period (1/20 fps=50 msec, for example) is divided into a read period for reading electric charge accumulated in the image pickup element 3 to a VCCD, a discharge period for discharging electric charge accumulated in the image pickup element 3 with an electronic shutter, and an accumulation period for accumulating electric charge in the image pickup element 3.

In the voice coil motor control device 30 according to this embodiment, the driving timing of the voice coil motor 31 is divided into movement periods and holding periods, as described in the first preferred embodiment. Further in this embodiment, the movement period is set not to coincide with the accumulation period in the driving timing of the image pickup element 3. Accordingly, the electric charge accumulation during the accumulation period is not affected even when the stepped vibration process during the movement period changes a lens position. In consideration of the effect on image pickup, the movement period is completed during the discharge period for implementing the electronic shutter feature of the image pickup element 3. In addition, an operation including the accumulation period of electric charge by the image pickup element 3 is performed during the holding period. While the above operation is a basic operation, the image pickup device according to the invention is capable of optimizing the movement period, the holding period, one frame period, the discharge period of electric charge (shutter speed) and the like depending on the image pickup state.

FIG. 19 depicts another driving timing of the image pickup element 3 and another driving timing of the voice coil motor 31. Unlike the FIG. 18 timing chart, two frame periods correspond to one drive period (movement period+holding period) in the FIG. 19 timing chart. The voice coil motor 31 can be controlled even when long-time exposure is performed in order to improve the sensitivity of the image pickup element 3. Again in this case, the movement period is set not to coincide with the accumulation period in the second frame. Accordingly, the electric charge accumulation during the accumulation period is not affected even when the stepped vibration process during the movement period changes a lens position.

As has been described, in the image pickup device shown in FIG. 15, the drive period of the voice coil motor 31 is divided into the movement periods and holding periods, and the stepped vibration process is performed during the movement period. This improves hysteresis characteristics of the voice coil motor 31 without having to drive the lens 1 in a U-turn, thereby shortening focusing time.

Figure 20:
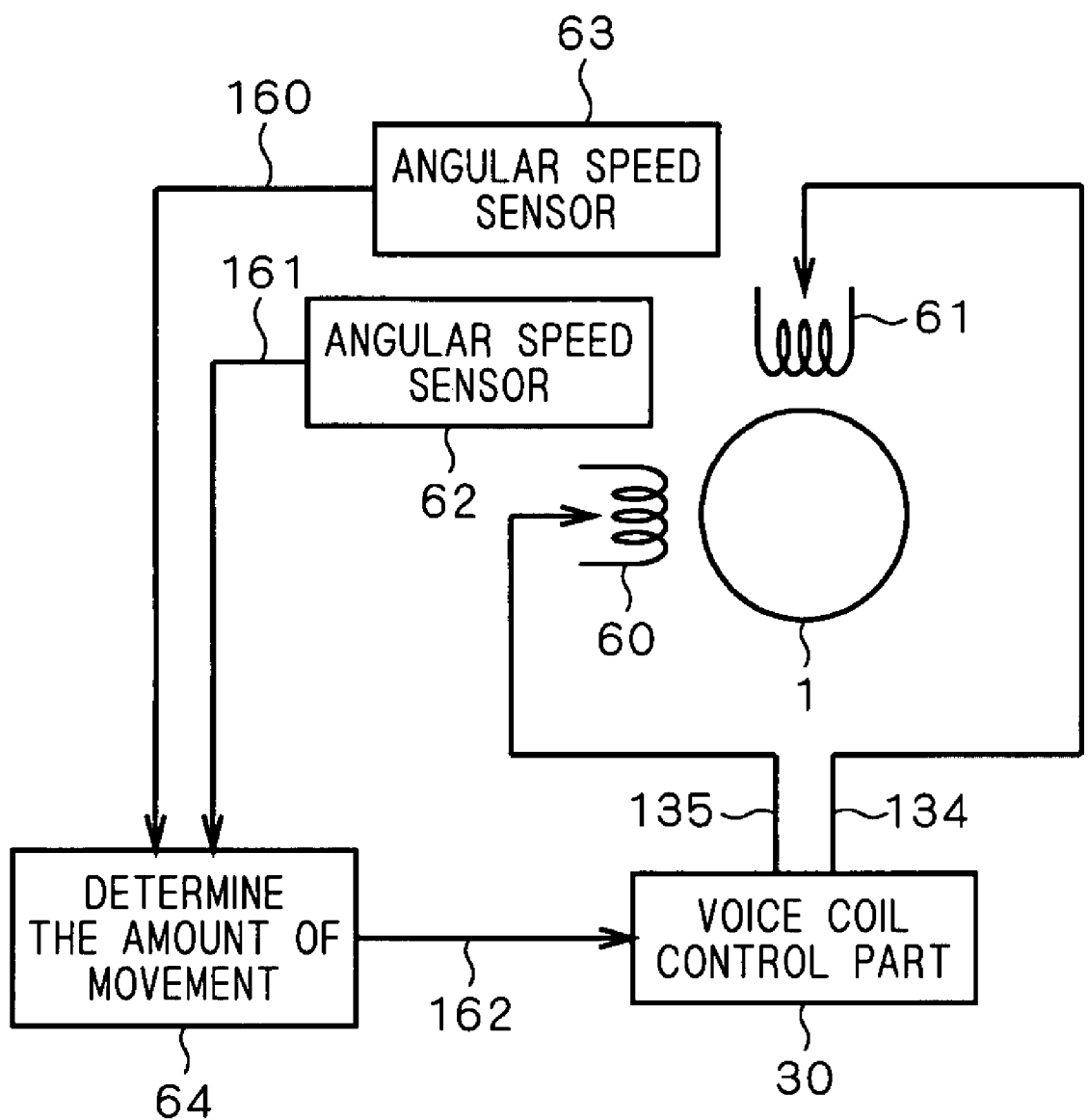
FIG. 20 is a block diagram of a shake correction system using the voice coil motor control device according to the second preferred embodiment.

Next, the voice coil motor control device 30 according to the second preferred embodiment is applied to a voice coil motor in a shake correction system. FIG. 20 illustrates a shake correction system. The shake correction system includes a vertical voice coil motor 60 for controlling the lens 1 in a vertical direction, a horizontal voice coil motor 61 for controlling the lens 1 in a horizontal direction, an angular speed sensor 62 for detecting an angular speed in a vertical direction, an angular speed sensor 63 for detecting an angular speed in a horizontal direction, the voice coil motor control device 30 for driving the vertical voice coil motor 60 and the horizontal voice coil motor 61, and a movement amount determination part 64 for determining the amount of movement for shake correction based on the outputs from the angular speed sensors 62 and 63.

When the lens 1 deviates from a fixed position due to hand-shake in the shake correction system shown in FIG. 20, the angular speed sensors 62 and 63 detect the deviation. The movement amount determination part 64 determines the amount of movement for shake correction based on outputs 161 and 160 from the angular speed sensors 62 and 63, and sends a control signal 162 including the amount of movement to the voice coil motor control device 30. The voice coil motor control device 30 supplies driving currents 135 and 134 based on the amount of movement to the vertical voice coil motor 60 and the horizontal voice coil motor 61, respectively. The vertical voice coil motor 60 and the horizontal voice coil motor 61 are driven by dividing the driving periods into movement periods and holding periods, and performing a stepped vibration process during the movement period, as described in the first preferred embodiment. As a result, the shake correction system shown in FIG. 20 improves hysteresis characteristics of the vertical voice coil motor 60 and the horizontal voice coil motor 61, thereby accurately correcting hand-shake.

Figure 21:
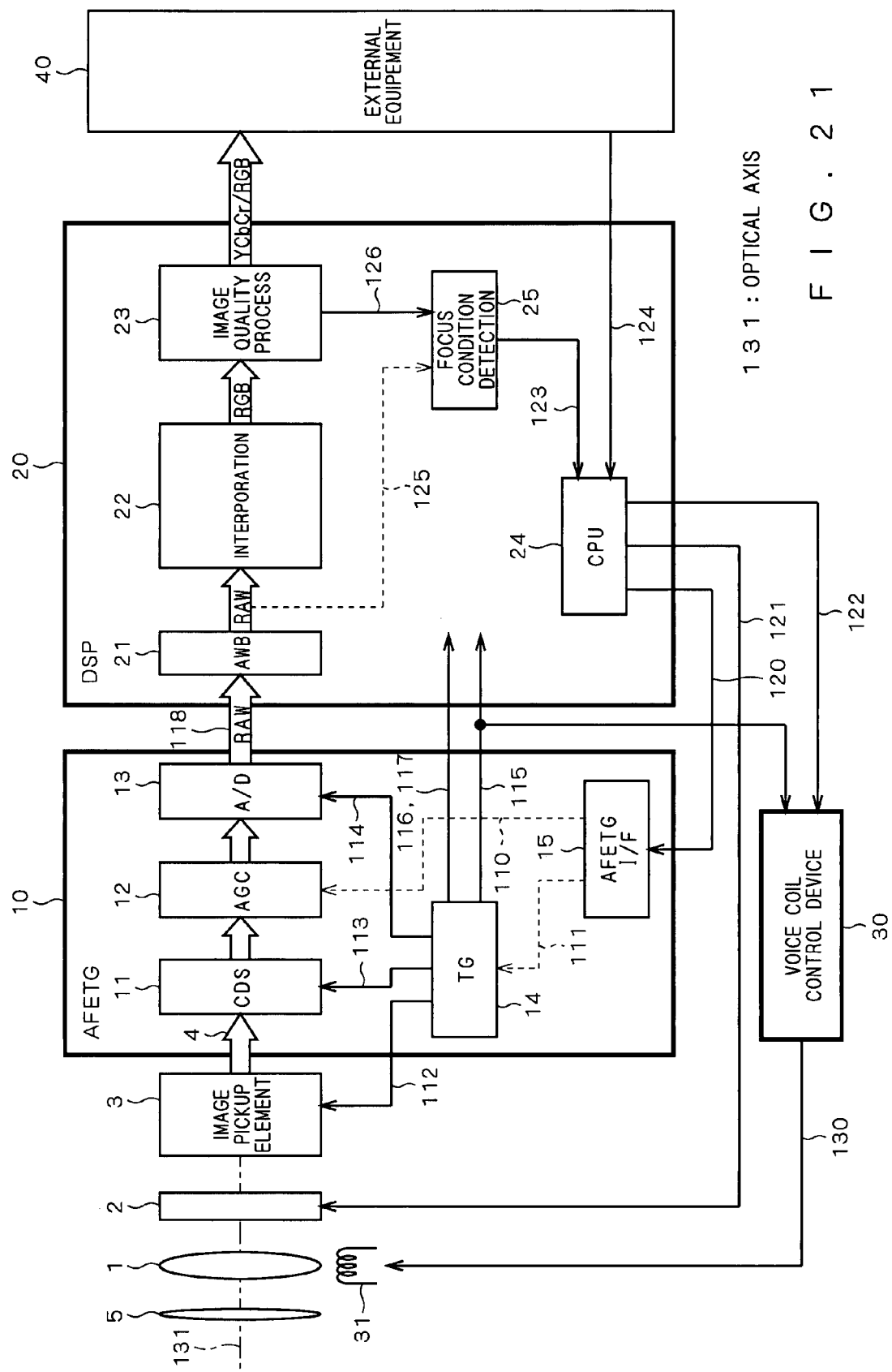
FIG. 21 is a block diagram of an image pickup device using the voice coil motor control device according to the second preferred embodiment.

Further, the voice coil motor control device 30 according to the second preferred embodiment is applied to a zoom-compatible image pickup device. FIG. 21 illustrates a zoom-compatible image-pickup device including the same elements as the image pickup device shown in FIG. 15, and further includes a fixed lens 5. The image pickup element 3, the fixed lens 5, and the movable lens 1 are on the optical axis 131, and the voice coil motor 31 is provided for the lens 1. With such structure, the image pickup device shown in FIG. 21 is capable of adjusting a distance between the lens 1 and the fixed lens 5, thereby implementing the zooming capability.

In the image pickup device shown in FIG. 21, the drive period of the voice coil motor 31 that drives the zoom-compatible lens 1 is divided into movement periods and holding periods, and a stepped vibration processing is performed during the movement period. This improves hysteresis characteristics of the voice coil motor 31 when moving the lens 1 back and forth on the optical axis 131, thereby preventing deviation of a zooming position.

Third Preferred Embodiment

Figure 22:
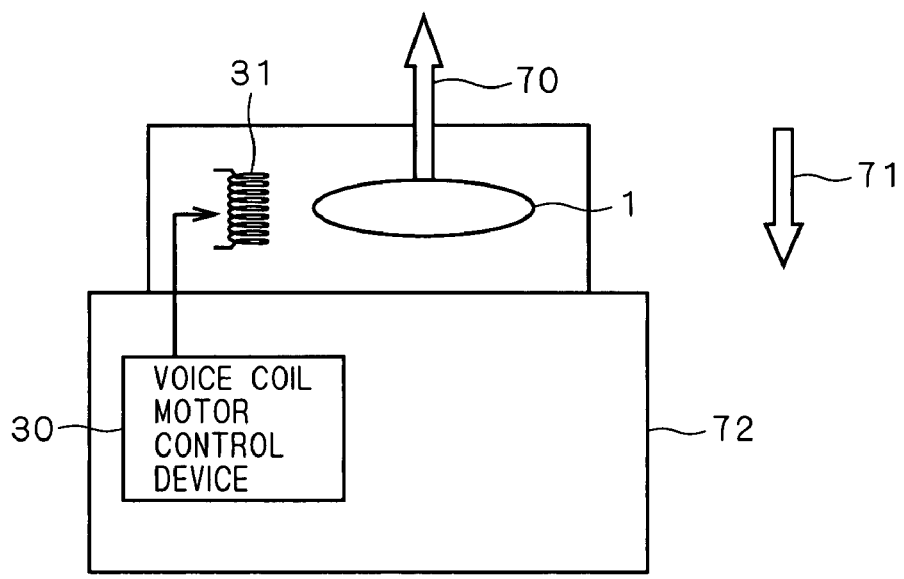
FIG. 22 shows an image pickup device arranged in an upward orientation according to a third preferred embodiment of the present invention.
Figure 23:
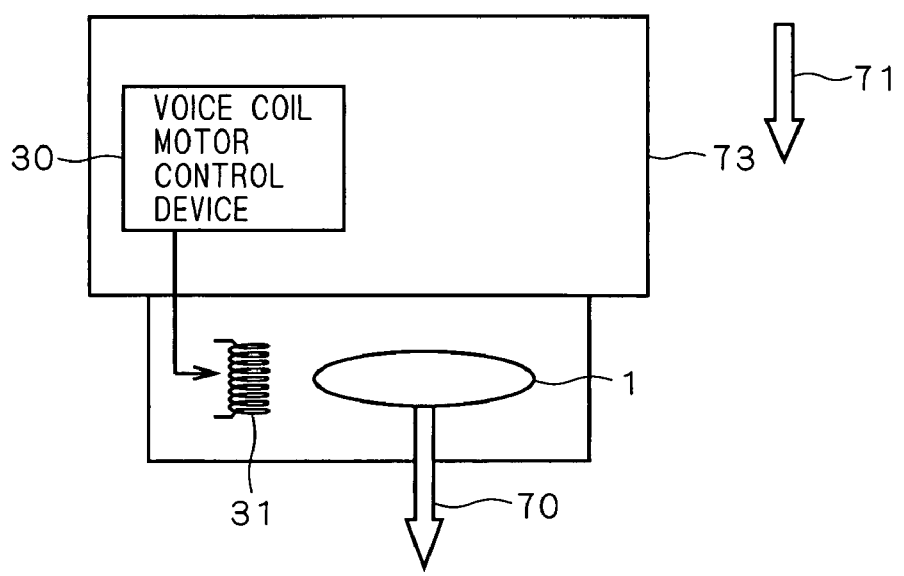
FIG. 23 shows an image pickup device arranged in a downward orientation according to the third preferred embodiment.
Figure 24:
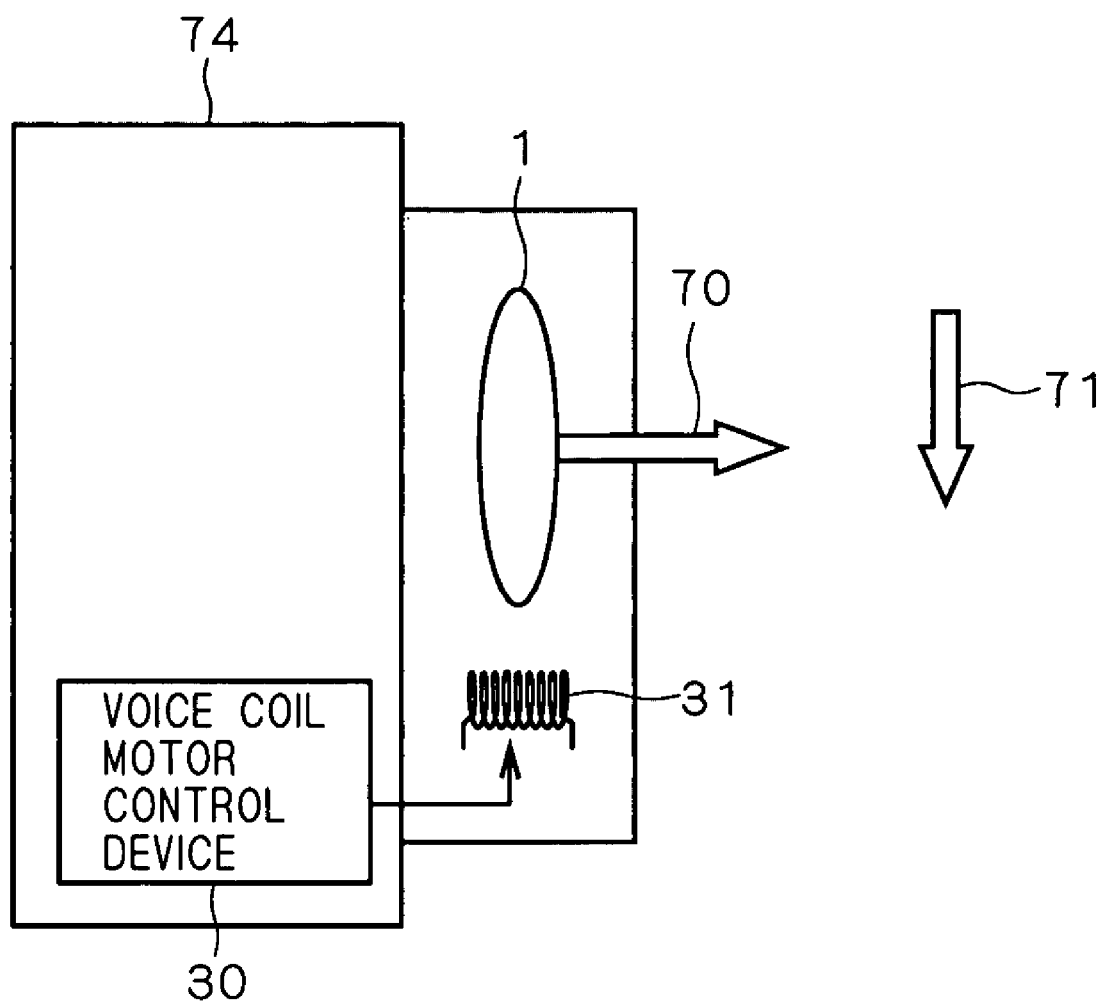
FIG. 24 shows an image pickup device arranged in a lateral orientation according to a third preferred embodiment.

This embodiment is directed to control of the voice coil motor control device 30 according to the invention in an image pickup device in different orientations. FIGS. 22 to 24 are schematic diagrams of the image pickup device using the voice coil motor control device 30 in different orientations. In an image pickup device 72 shown in FIG. 22, a direction indicated by an arrow 70 denotes a forward direction of movement for the lens 1 driven by the voice coil motor 31. On the other hand, gravity acts on the image pickup device 72 in a direction indicated by an arrow 71. In short, the arrow 71 of gravity and the arrow 70 of movement direction of the lens 1 act in opposite directions, which means that the image pickup device 72 is arranged in an upward orientation. The voice coil motor 31 is controlled by the voice coil motor control device 30 according to the invention.

In an image pickup device 73 shown in FIG. 23, a direction indicated by the arrow 70 denotes a forward direction of movement for the lens 1 driven by the voice coil motor 31. On the other hand, gravity acts on the image pickup device 73 in a direction indicated by the arrow 71. In short, the arrow 71 of gravity and the arrow 70 of movement direction of the lens 1 act in the same direction, which means that the image pickup device 73 is arranged in a downward orientation. The voice coil motor 31 is controlled by the voice coil motor control device 30 according to the invention.

In an image pickup device 74 shown in FIG. 24, a direction indicated by the arrow 70 denotes a forward direction of movement for the lens 1 driven by the voice coil motor 31. On the other hand, gravity acts on the image pickup device 74 in a direction indicated by the arrow 71. In short, the arrow 71 of gravity and the arrow 70 of movement direction of the lens 1 act in an orthogonal direction, which means that the image pickup device 74 is arranged in a lateral orientation. The voice coil motor 31 is controlled by the voice coil motor control device 30 according to the invention.

Figure 25:
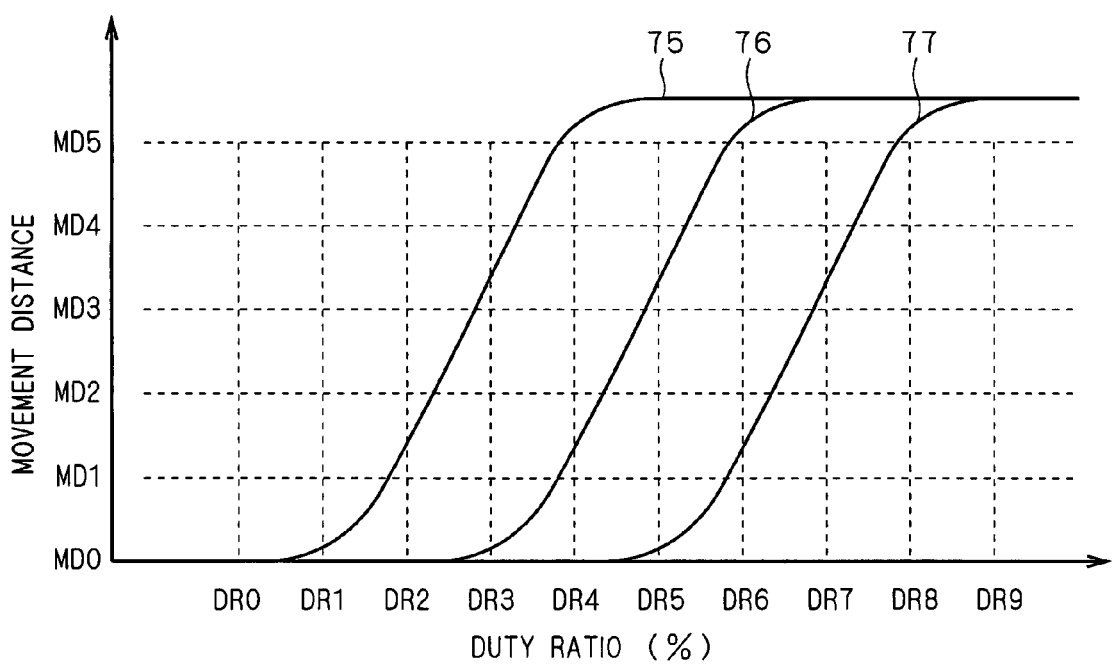
FIG. 25 depicts the relationship between a duty ratio and a movement distance with respect to the arrangement of the image pickup devices according to the third preferred embodiment.

In the image pickup devices 72, 73 and 74 shown in FIGS. 22 to 24, the voice coil motor control device 30 according to the invention controls the voice coil motor 31, thereby improving hysteresis characteristics of the voice coil motor 31. FIG. 25 depicts the relationship between the duty ratio and a movement distance with improved hysteresis characteristics in the image pickup devices 72, 73 and 74 shown in FIGS. 22 to 24. In FIG. 25, a characteristic 75 is directed to the image pickup device 73 arranged in a downward orientation, a characteristic 76 is directed to the image pickup device 74 arranged in a lateral orientation, and a characteristic 77 is directed to the image pickup device 72 arranged in an upward orientation.

Duty ratios DR0 to DR9 in the horizontal axis of FIG. 25 are duty ratio steps set to implement autofocus without being affected by the orientation of the image pickup device. The image pickup devices 72, 73 and 74 thus detect an evaluation value for each step of the duty ratio, to determine focus. Step intervals (from DR1 to DR0, for example) and the number of steps (10 steps in FIG. 25) of the duty ratio are determined in consideration of variations in evaluation value of the orientation of the image pickup device, and a subject depth. Movement distances MD0 to MD5 in the vertical axis of FIG. 25 represent the movement distance of the lens 1 driven by the voice coil motor 31.

As described above, in this embodiment, different hysteresis characteristics depending on the orientation of the image pickup devices 72, 73 and 74 using the voice coil motor control device 30 can be improved.

The invention claimed is:

1. A voice coil motor control device performing drive control of a voice coil motor, comprising:
   a driving current control part for controlling a driving current supplied to said voice coil motor in accordance with a driving pulse subjected to pulse width modulation; and
   a driving pulse control part for dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value.

2. The voice coil motor control device according to claim 1, further comprising
   a duty ratio holding part for generating the amount of change in duty ratio of said driving pulse during said movement period in accordance with prescribed rules based on said duty setting value, and supplying said amount of change to said driving pulse control part.

3. The voice coil motor control device according to claim 1, further comprising
   a duty ratio holding part for reading the amount of change in duty ratio of said driving pulse for each period during said movement period from a prescribed look-up table based on said duty setting value, said movement period being divided into a plurality of periods, and supplying said amount of change to said driving pulse control part.

4. The voice coil motor control device according claim 1 used in an image pickup device, wherein
   said movement period is provided not to coincide with at least one accumulation period during a frame period of an image pickup element.

5. An image pickup device comprising a voice coil motor control device performing drive control of a voice coil motor, said voice coil motor control device including:
   a driving current control part for controlling a driving current supplied to said voice coil motor in accordance with a driving pulse subjected to pulse width modulation; and
   a driving pulse control part for dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value,
   said image pickup device further comprising:
   a focus condition detection part for detecting a focus state of a subject; and
   a control part for changing said duty setting value of said voice coil motor control device to maximize the detection result by said focus condition detection part.

6. An image pickup device comprising a voice coil motor control device performing drive control of a voice coil motor, said voice coil motor control device including:
- a driving current control part for controlling a driving current supplied to said voice coil motor in accordance with a driving pulse subjected to pulse width modulation; and
- a driving pulse control part for dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value, wherein
- steps of said duty ratio corresponding to a movement distance of a lens that implements autofocus are determined in consideration of variations of an orientation of said image pickup device, and a subject depth.

7. A method for driving a voice coil motor control device performing drive control of a voice coil motor, comprising the steps of:
- dividing a drive period of said voice coil motor into a holding period and a movement period, in said holding period said voice coil motor being driven with a prescribed duty setting value and in said movement period said voice coil motor being driven with a duty ratio different from said prescribed duty setting value, and
- changing a driving current supplied to said voice coil motor based on prescribed standards during said movement period.

8. A method for driving a voice coil motor control device performing drive control of a voice coil motor, comprising the steps of:
- reading a prescribed duty setting value in order to set a duty ratio of a driving pulse;
- reading the amount of change in said duty ratio for each one of prescribed periods in said drive period from a prescribed look-up table based on said duty setting value; and
- setting said amount of change and generating said driving pulse for each one of said prescribed periods.

9. A method for driving a voice coil motor control device performing drive control of a voice coil motor, comprising the steps of:
- controlling a driving current supplied to said voice coil motor in accordance with a driving pulse subjected to pulse width modulation;
- dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value;
- detecting a focus state of a subject; and
- changing said duty setting value of said voice coil motor control device to maximize the detection result by said focus detecting step.

10. A method for driving a voice coil motor control device performing drive control of a voice coil motor, comprising the steps of:
- controlling a driving current supplied to said voice coil motor in accordance with a driving pulse subjected to pulse width modulation;
- dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value.

11. A method for driving a voice coil motor control device used for an image pick up device, comprising the steps of:
- controlling a driving current supplied to said voice coil motor in accordance with a driving pulse subjected to pulse width modulation; and
- dividing a drive period of said voice coil motor into a holding period and a movement period, in said holding period said voice coil motor being driven with a prescribed duty setting value and in said movement period said voice coil motor being driven with a duty ratio different from said prescribed duty setting value, to control said driving pulse by changing a duty ratio of said driving pulse during said movement period from said duty setting value and fixing a duty ratio of said driving pulse during said holding period to said duty setting value, wherein
- steps of said duty ratio corresponding to a movement distance of a lens that implements autofocus are determined in consideration of variations of an orientation of said image pickup device, and a subject depth.

* * * * *